(12) United States Patent
Feinstein

(10) Patent No.: US 7,566,487 B2
(45) Date of Patent: Jul. 28, 2009

(54) REACTOR WITH PRIMARY AND SECONDARY CHANNELS

(76) Inventor: Jonathan Jay Feinstein, 9A Crosby Rd., North Salem, NY (US) 10560

(*) Notice: Subject to any disclaimer, the term of this patent is extended or adjusted under 35 U.S.C. 154(b) by 595 days.

(21) Appl. No.: 10/886,237

(22) Filed: Jul. 7, 2004

(65) Prior Publication Data

US 2006/0008399 A1    Jan. 12, 2006

(51) Int. Cl.
*B32B 3/12* (2006.01)
(52) U.S. Cl. .................................. 428/116; 428/117
(58) Field of Classification Search .................. None
See application file for complete search history.

(56) References Cited

U.S. PATENT DOCUMENTS

| | | | |
|---|---|---|---|
| 2,602,651 A | 7/1952 | Cannon | |
| 3,785,620 A | 1/1974 | Huber | |
| 4,296,050 A | 10/1981 | Meier | |
| 4,318,894 A | 3/1982 | Hensel et al. | |
| 4,340,501 A | 7/1982 | Davidson | |
| 4,349,450 A | 9/1982 | Hunter | |
| 4,719,090 A | 1/1988 | Masaki | |
| 5,051,241 A | 9/1991 | Pfefferle | |
| 5,177,961 A * | 1/1993 | Whittenberger | 60/300 |
| 5,330,728 A | 7/1994 | Foster | |
| 5,350,566 A | 9/1994 | Stringaro | |
| 5,370,943 A | 12/1994 | Brück et al. | |
| 5,473,082 A | 12/1995 | Sheldon et al. | |
| 5,846,495 A | 12/1998 | Whittenberger et al. | |
| 6,179,608 B1 | 1/2001 | Kraemer et al. | |
| 6,214,304 B1 | 4/2001 | Rosenthal et al. | |
| 6,214,305 B1 | 4/2001 | van Harderveld et al. | |
| 6,348,278 B1 * | 2/2002 | LaPierre et al. | 429/17 |
| 6,534,022 B1 | 3/2003 | Carlborg et al. | |
| 2003/0012711 A1 | 1/2003 | Harkins et al. | |
| 2006/0029541 A1 | 2/2006 | Tonkovich et al. | |

FOREIGN PATENT DOCUMENTS

WO        WO 96/05906 A1        2/1996

OTHER PUBLICATIONS

Gulati, Suresh, Ceramic Catalyst Supports and Filters for Diesel Exhaust Aftertreatment, *Structured Catalysts and Reactors*, Cybulski & Moulijn editors, Marcel Dekker Inc., 1998, pp. 506-517.
Notice of Preliminary Rejection dated May 27, 2008 in corresponding Korean Patent Application No. 10-2007-7003000 and English translation thereof.
International Search Report Apr. 7, 2008 in PCT International Application PCT/US05/21105 filed Jun. 16, 2005.
Related U.S. Appl. No. 12/152,228, filed May 13, 2008; Inventor: Jonathan Jay Feinstein.
First Examination Report dated Oct. 21, 2008 in corresponding Indian Patent Application No. 59/MUMNP/2007.

* cited by examiner

*Primary Examiner*—Timothy M Speer
(74) *Attorney, Agent, or Firm*—Robert P. Michal; Frishauf, Holtz, Goodman & Chick, P.C.

(57) ABSTRACT

An improved reactor comprises primary channels connected by secondary channels. Primary and secondary channels are of orientations and dimensions as to cause fluid to flow through the primary and secondary channels. Catalyst may be coated on the inside of the secondary channels.

23 Claims, 23 Drawing Sheets

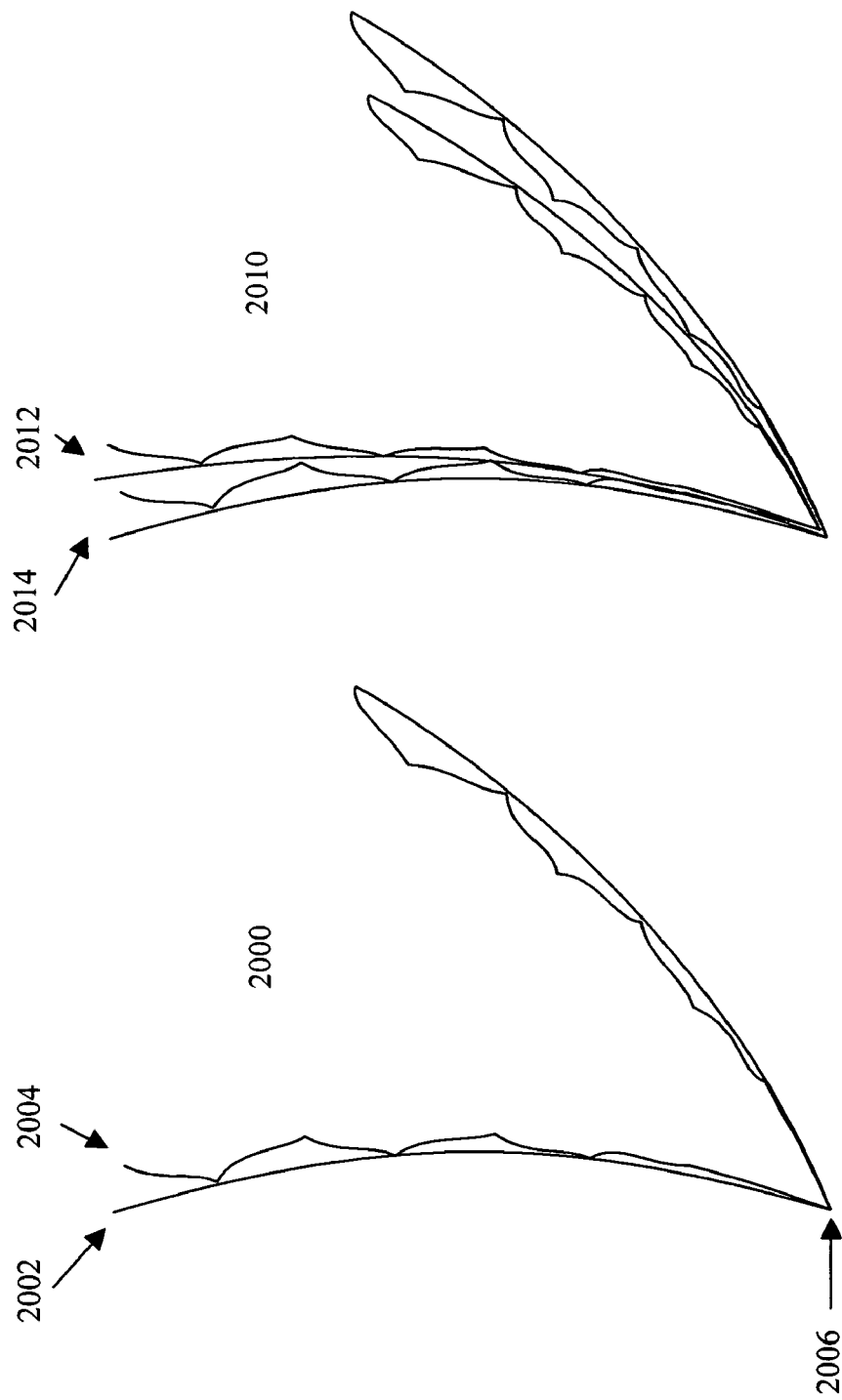

Fig. 21C
Fig. 21B
2100
Fig. 21A
Fig. 21

REACTOR WITH PRIMARY AND SECONDARY CHANNELS

FIELD OF INVENTION

This invention is in the field of catalytic reactors.

BACKGROUND

Catalytic reactors are known which comprise an inlet, an outlet, a reactor chamber and a monolithic structure. The monolithic structure is placed within the reactor chamber and a catalytic material is coated on the monolithic structure.

FIG. 1 is a cutaway view of one prior art reactor 100. An example may be found in FIG. 3 of U.S. Pat. No. 5,330,728 to Michael Foster.

The reactor comprises primary channel walls 102 of the monolith and reactor chamber walls 104. The primary channel walls are parallel to each other and to the reactor walls. The primary channel walls form primary channels 103.

The primary channel walls form a monolithic structure wherein each primary channel has a square cross section.

The primary channel walls are coated with a catalyst.

In operation, reactant fluid 110 is caused to flow into the primary channels, react with the catalysts on the primary channel walls and then exit. As used herein unless otherwise specifically indicated or indicated by context, double line arrows indicate fluid flow.

One of the disadvantages of this prior art is that no means is provided to mix the fluids entering different primary channels. Thus if one channel gets a high flow 122 of fluid, said fluid will have a short residence time and hence less reaction with the catalyst than the average fluid. Similarly, if one channel gets a low flow 124 of fluid, then it will have more reaction with the catalyst than the average fluid. Thus a reactor may have to be oversized to account for the difference in fluid flows through different channels.

Another disadvantage of this prior art is that fluids often form a laminar flow as they pass down the primary channels. Thus the fluid 150 passing down the center of a primary channel will have a higher velocity and lower residence time than the fluid 154 passing down next to the walls of the channel. Thus a reactor may have to be oversized to account for the different fluid residence times of the laminar flows near the walls and near the center of primary channels.

Furthermore, this prior art has no means of convective heat transfer from the center of the monolith to the reactor walls.

FIG. 2 is a cutaway view of alternate prior art reactor design 200. An example of this prior art is illustrated in FIG. 2 of U.S. Pat. No. 5,051,241 to William Pfefferle.

The reactor comprises primary channel walls 202 and reactor walls 204. The primary channel walls are parallel to each other and traverse the reactor. The primary channel walls form primary channels 203. Both ends of all of the primary channels are blocked by the reactor walls.

Secondary channels 206 are provided in the primary channel walls to allow inlet fluid 210 to pass therethrough.

Primary channel walls may be a woven wire mesh where the secondary channels are the openings in the mesh. Catalyst is deposited on the walls of the wire forming the wire mesh. Catalyst thus coats both the primary channel walls and the secondary channel walls.

One of the disadvantages of this prior art is that there is a relatively high pressure drop as fluid proceeds from one primary channel wall to the next primary channel wall.

SUMMARY OF THE INVENTION

The Summary of the Invention is provided as a guide to understanding the invention. It does not necessarily describe the most generic embodiment of the invention or all species of the invention disclosed herein.

The invention is an apparatus for carrying out reactions of fluid at a catalytic substrate whereby primary channels are formed at an angle to a reactor wall such that at least one primary channel is open at either its inlet or outlet and closed at its opposite end. Secondary channels perforate the primary channel walls such that fluid can pass into or out of the at least one primary channel with its inlet or outlet blocked.

BRIEF DESCRIPTION OF DRAWINGS

FIG. 20 is a plan view of a construction technique for the monolith of FIG. 18.

FIG. 21 is a plan view of a formation technique for the corrugated sheets of FIG. 20.

DETAILED DESCRIPTION OF THE INVENTION

The following detailed description discloses various exemplary embodiments and features of the invention. These exemplary embodiments and features are not meant to be limiting.

Figure 1:
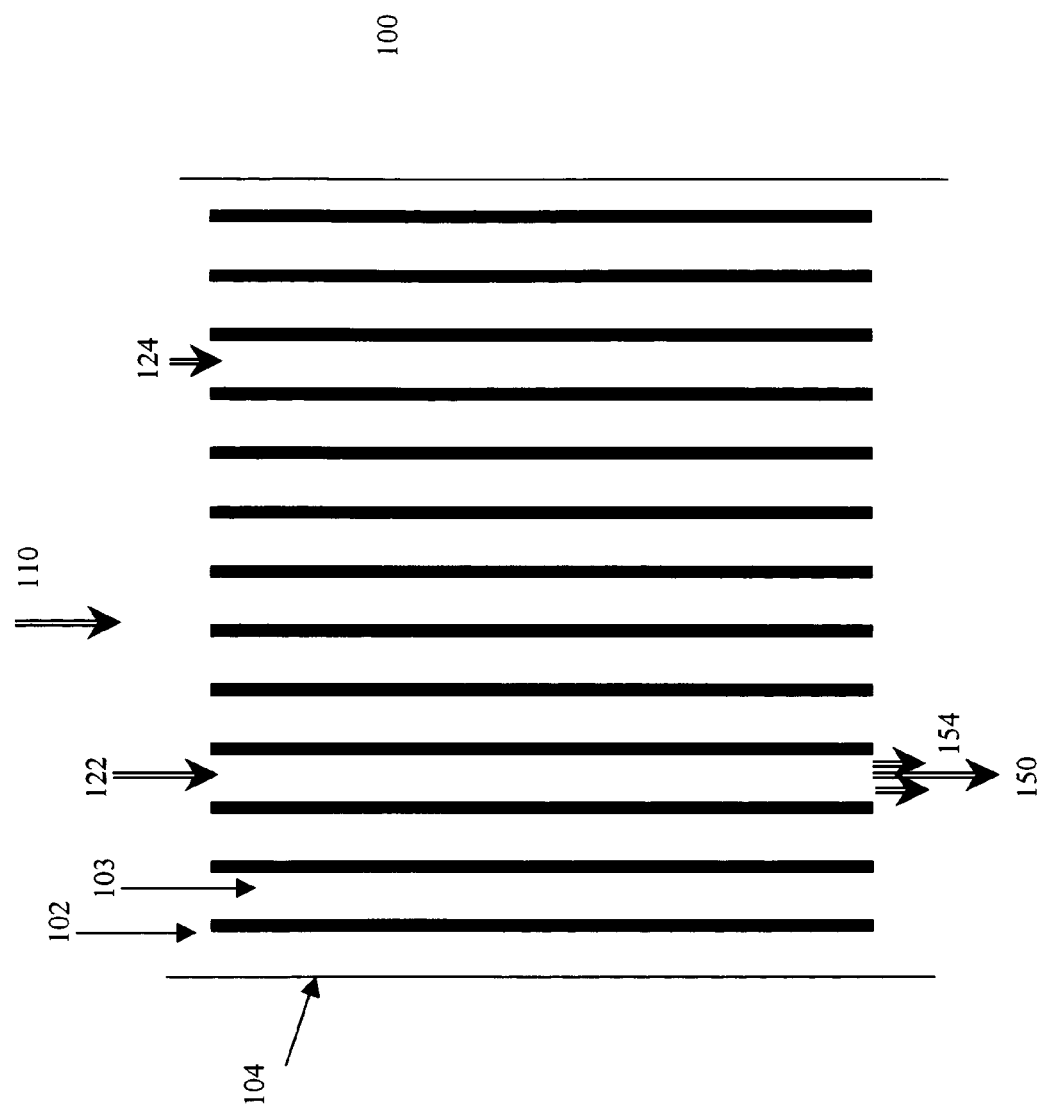
FIG. 1 is a cut away view of one example of prior art.
Figure 2:
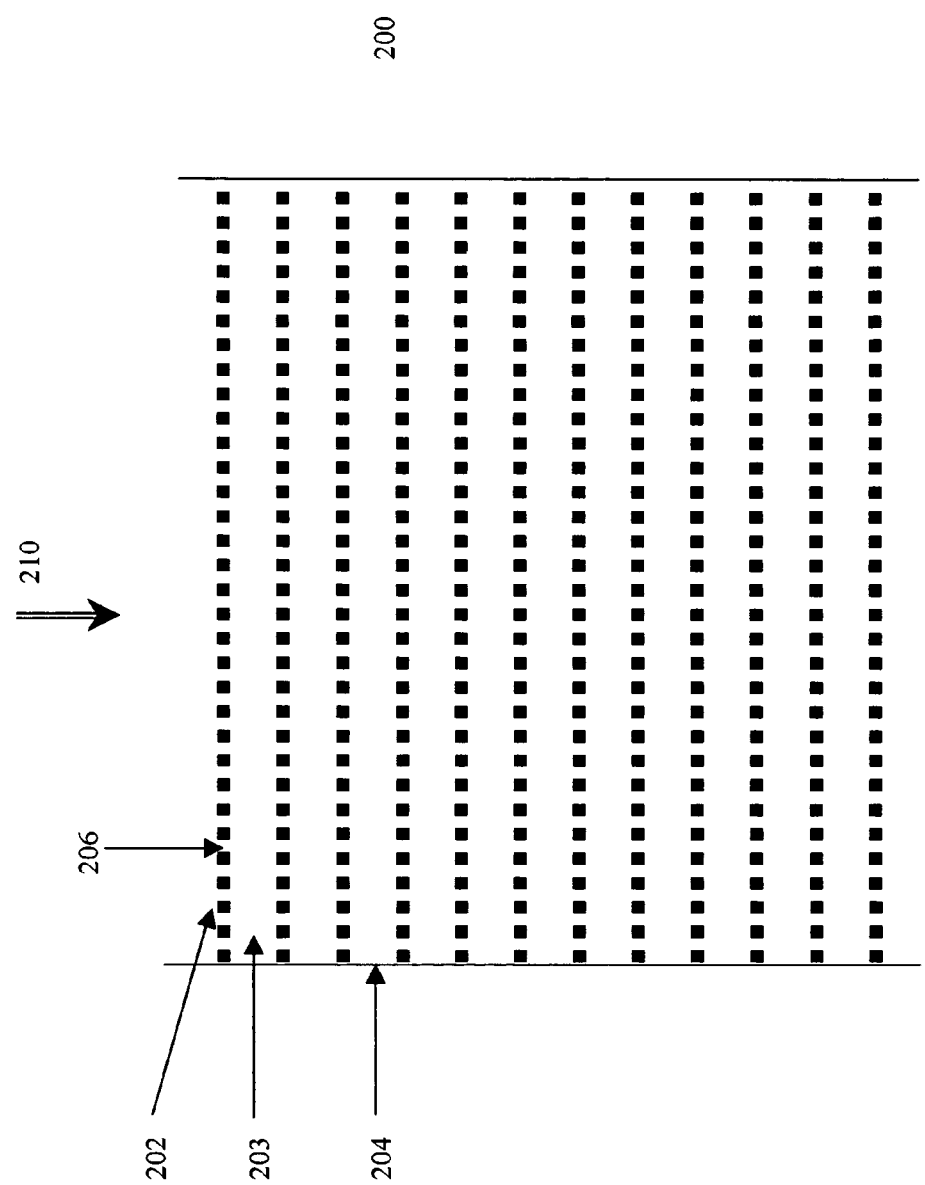
FIG. 2 is a cut away view of another example of prior art.
Figure 3:
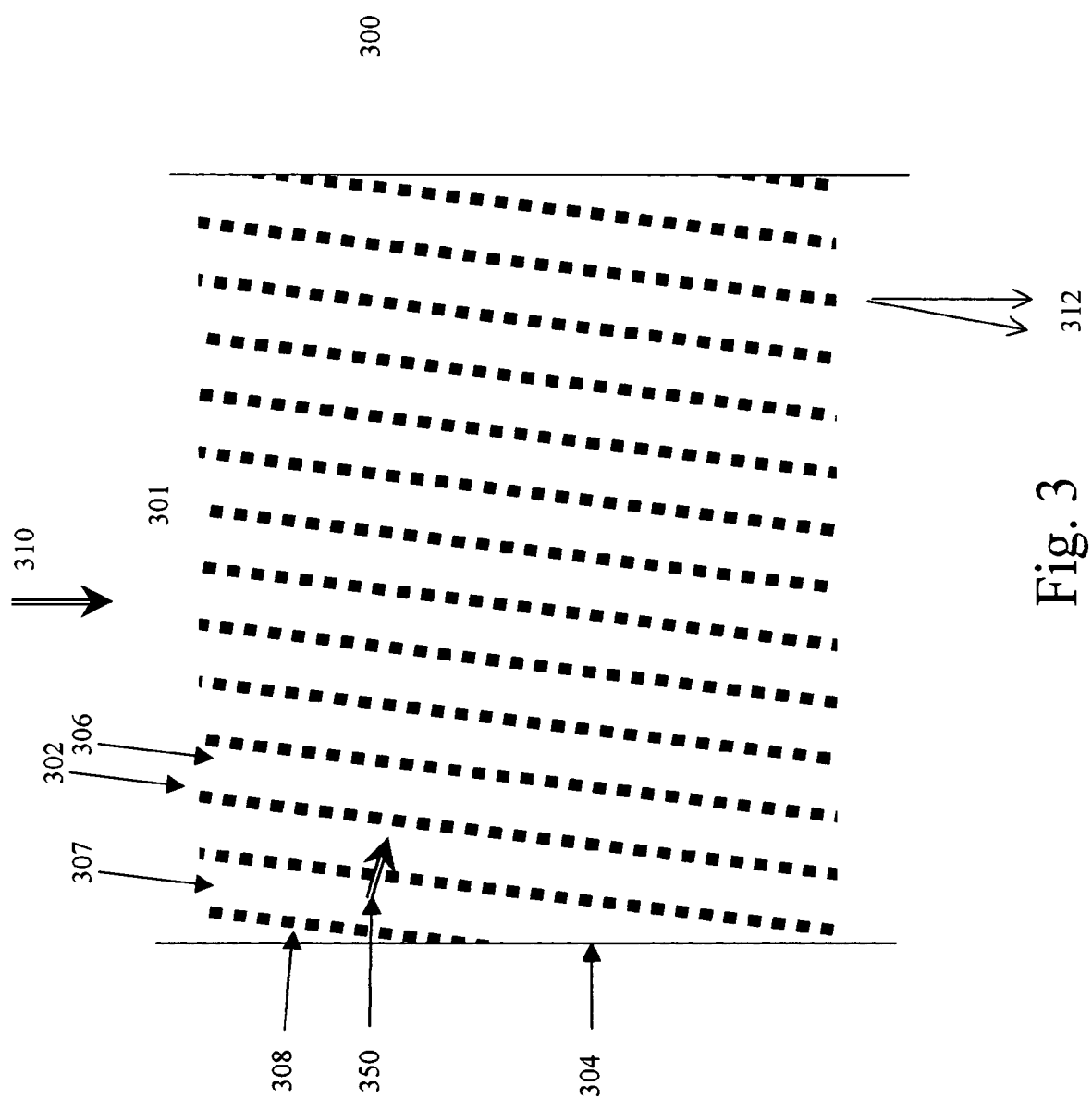
FIG. 3 is a cut away view of one embodiment of a reactor according to the present invention.

FIG. 3 illustrates a longitudinal cross section of embodiment 300 of the present invention. Embodiment 300 comprises reactor walls 304 and monolithic catalyst support 301. The monolithic catalyst support comprises primary channel walls 302 which form primary channels 306. The primary channel walls are inclined at angle 312 of more than 0° and less than 90° relative to the reactor walls such that at least one primary channel 307 has one end blocked by reactor wall 304. The other end of at least one primary channel 307 is open. Other conventional means, such as a plug, may be used to block the end of a primary channel.

The primary channel walls comprise secondary channels 308. The secondary channels allow at least a portion 350 of fluid 310 entering the monolith to flow from one primary channel to an adjacent primary channel.

Catalyst is coated on the walls of the secondary channels. Thus, a substantial amount of the reaction in the monolith takes place inside the secondary channels. The primary channel walls may also be coated with catalyst.

Suitable inlet fluids include the exhaust gas from an internal combustion engine. Suitable catalysts include noble metal catalysts including platinum group metals. Suitable materials for the monolith include ceramics, such as alumina or cordierite, and metals, such as stainless steel.

Suitable inlet fluids can also include blends of natural gas and water used to produce hydrogen by steam reforming. Known catalysts, materials of construction, operating temperatures and pressures may be used for steam reforming.

Explanation

While not being held to this explanation, it is believed that the combination of primary channels connected by secondary channels within said primary channel walls in the presence of a pressure differential from one side of the said primary channel wall to the other side of the primary channel wall causes at least a portion 350 of fluid 310 entering the monolith to preferentially flow from one primary channel to an adjacent primary channel. This cross flow of fluid disrupts boundary layers along the primary channel walls thus helping to increase solid-fluid reactions and create well mixed fluid within the primary channels. This mixing helps insure a uniform distribution of residence time of the fluid in the reactor, thus increasing the reactor efficiency. Jet impingement of fluid from secondary channels onto reactor walls increases heat transfer at reactor walls.

When well-mixed flow passes through a relatively short secondary channel, the reaction rates with the catalyst therein are higher due to the relative lack of a boundary layer. The secondary channels act essentially as plug flow reactors.

When inlet fluids preferentially flow from one well-mixed primary channel to another, the reaction with the catalyst in the corresponding secondary channels is more efficient. The system acts as a series of alternating plug flow reactors and well-stirred reactors.

By keeping at least some of the ends of the primary channels open, the pressure drop of the flow through the reactor is kept to a minimum.

By preferentially directing the fluid flow to or from a reactor wall, the heat transfer at the wall is increased. This higher heat transfer helps keep endothermic reactions warmer and exothermic reactions cooler. A more homogeneous temperature within the reactor increases catalytic selectivity.

Alternate Embodiments

Figure 4:
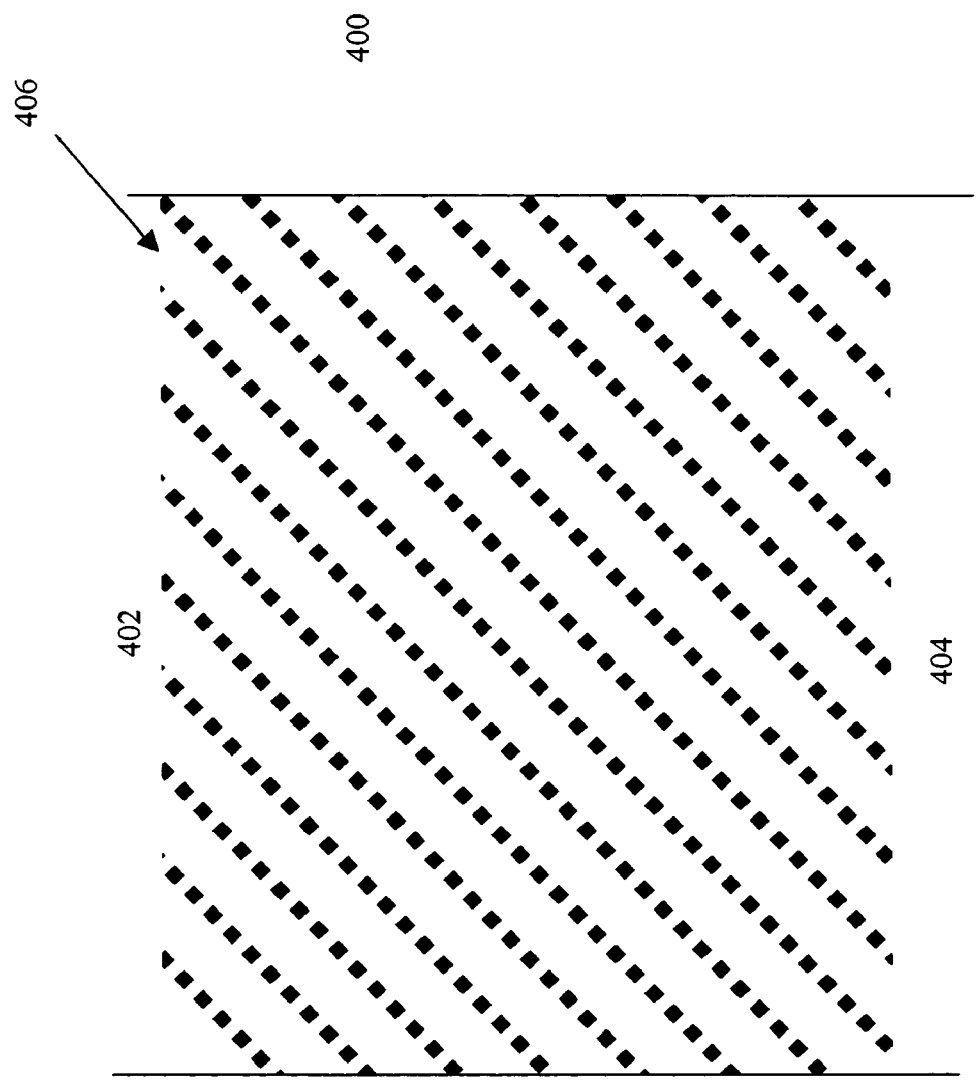
FIG. 4 is a cut away view of an alternate embodiment of the present invention.

FIG. 4 illustrates the transverse cross section of alternate embodiment 400. At least one primary channel 406 is open at both the inlet 402 of the reactor and the outlet 404 of the reactor.

Figure 5:
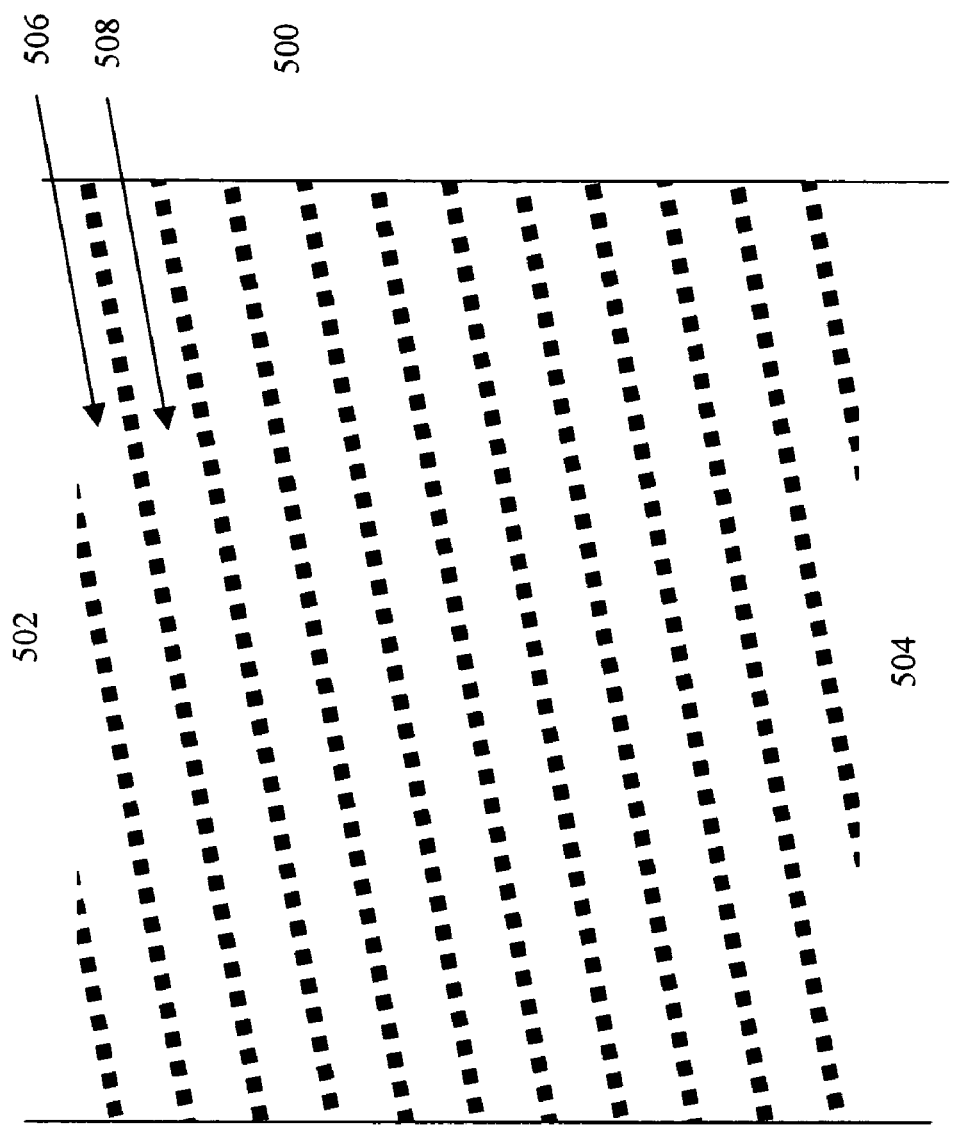
FIG. 5 is a cut away view of another alternate embodiment of the present invention.

FIG. 5 illustrates the transverse cross section of alternate embodiment 500. At least one primary channel 506 is open at either the inlet 502 of the reactor or the outlet 504 of the reactor. Additionally, at least one primary channel 508 is blocked at both ends.

Figure 6:
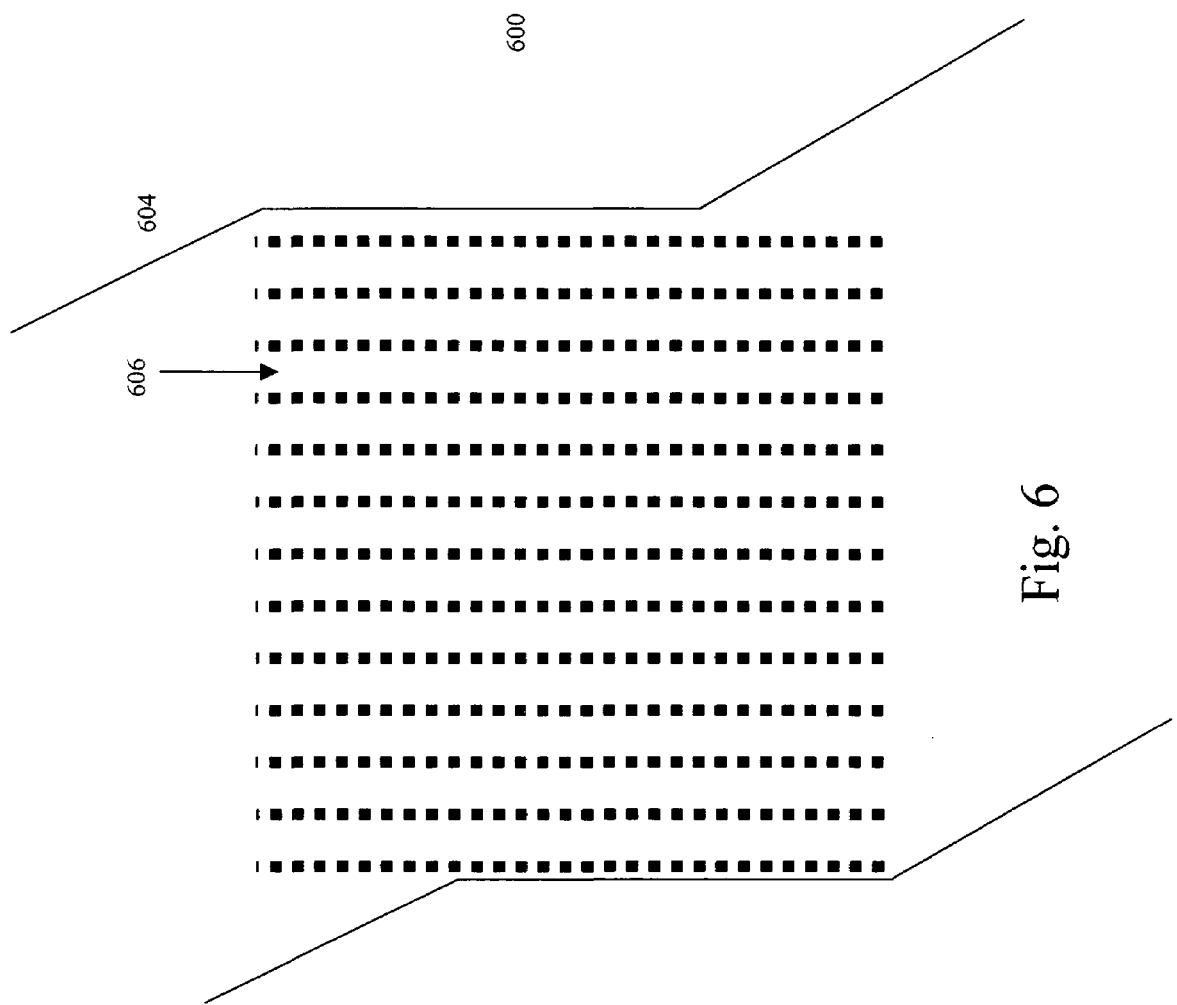
FIG. 6 is a cut away view of another alternate embodiment of the present invention.

FIG. 6 illustrates the transverse cross section of alternate embodiment 600. At least one primary channel 606 is at an angle of more than 0 degrees and less than 90 degrees to at least a portion 604 of the reactor wall.

Figure 7:
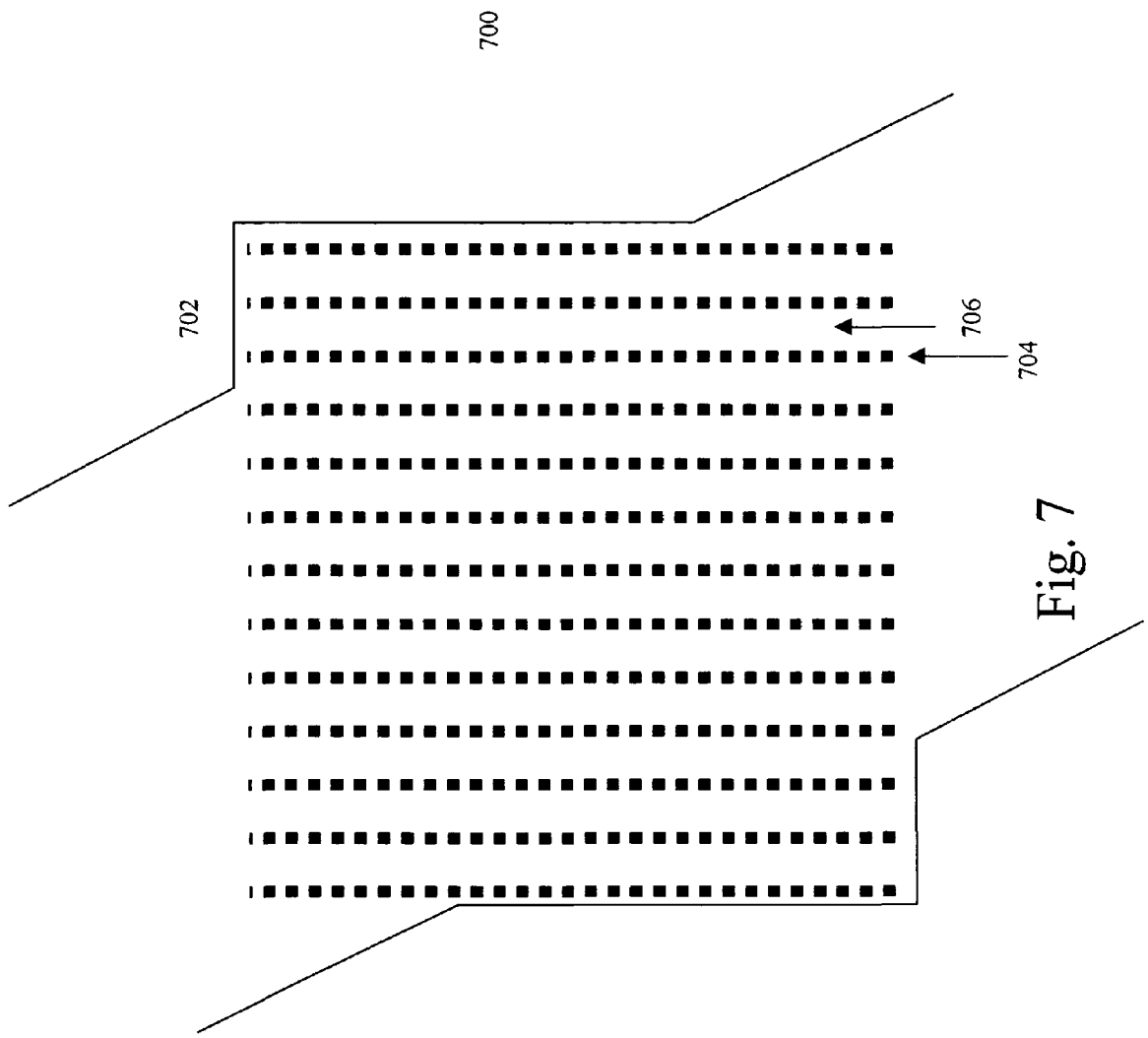
FIG. 7 is a cut away view of another alternate embodiment of the present invention.

FIG. 7 illustrates the transverse cross section of alternate embodiment 700. At least one primary channel 706 is blocked by a portion 702 of a reactor wall that is at an angle to primary channel wall 704. The angle may be 90 degrees.

Figure 8:
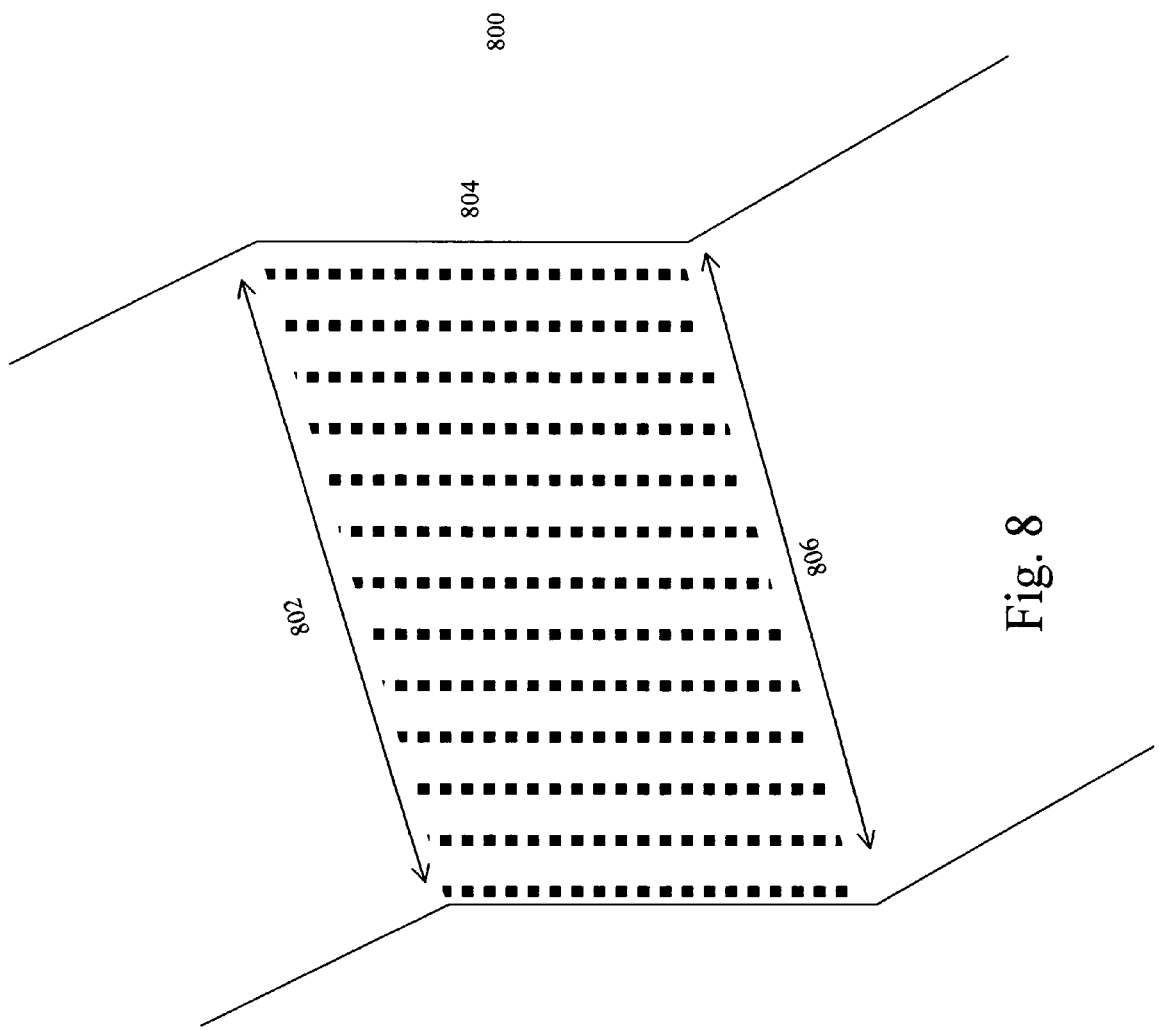
FIG. 8 is a cut away view of another alternate embodiment of the present invention.

FIG. 8 illustrates the transverse cross section of alternate embodiment 800. At least the inlet face 802 or outlet face 806 of the monolith is at an angle other than 90 degrees with respect to a portion 804 of a reactor wall.

Figure 9:
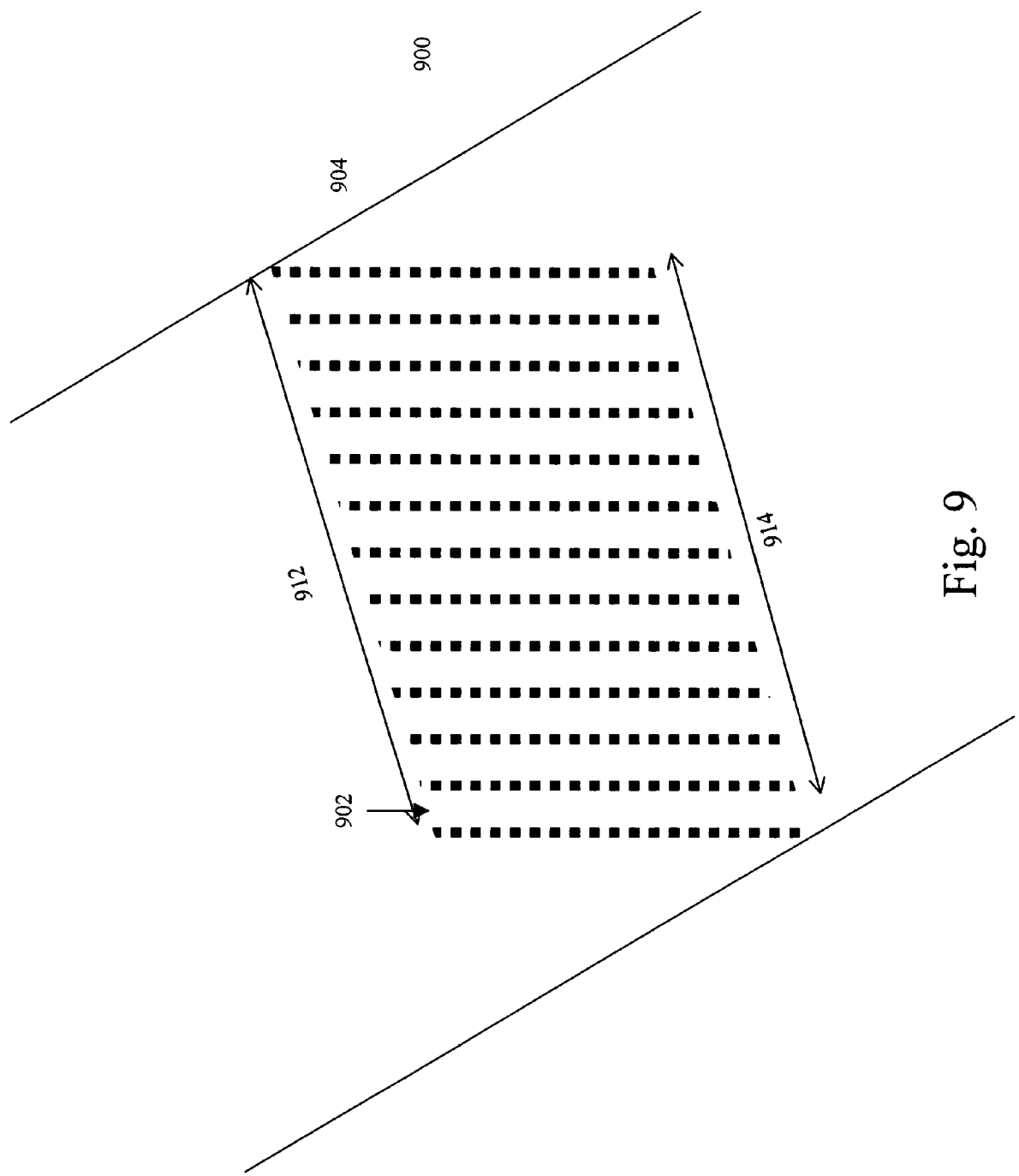
FIG. 9 is a cut away view of another alternate embodiment of the present invention.

FIG. 9 illustrates the transverse cross section of alternate embodiment 900. All primary channels 902 are open at both their inlets and outlets and are not parallel to the reactor wall 904 and are not normal to inlet face 912 or outlet face 914.

Figure 10:
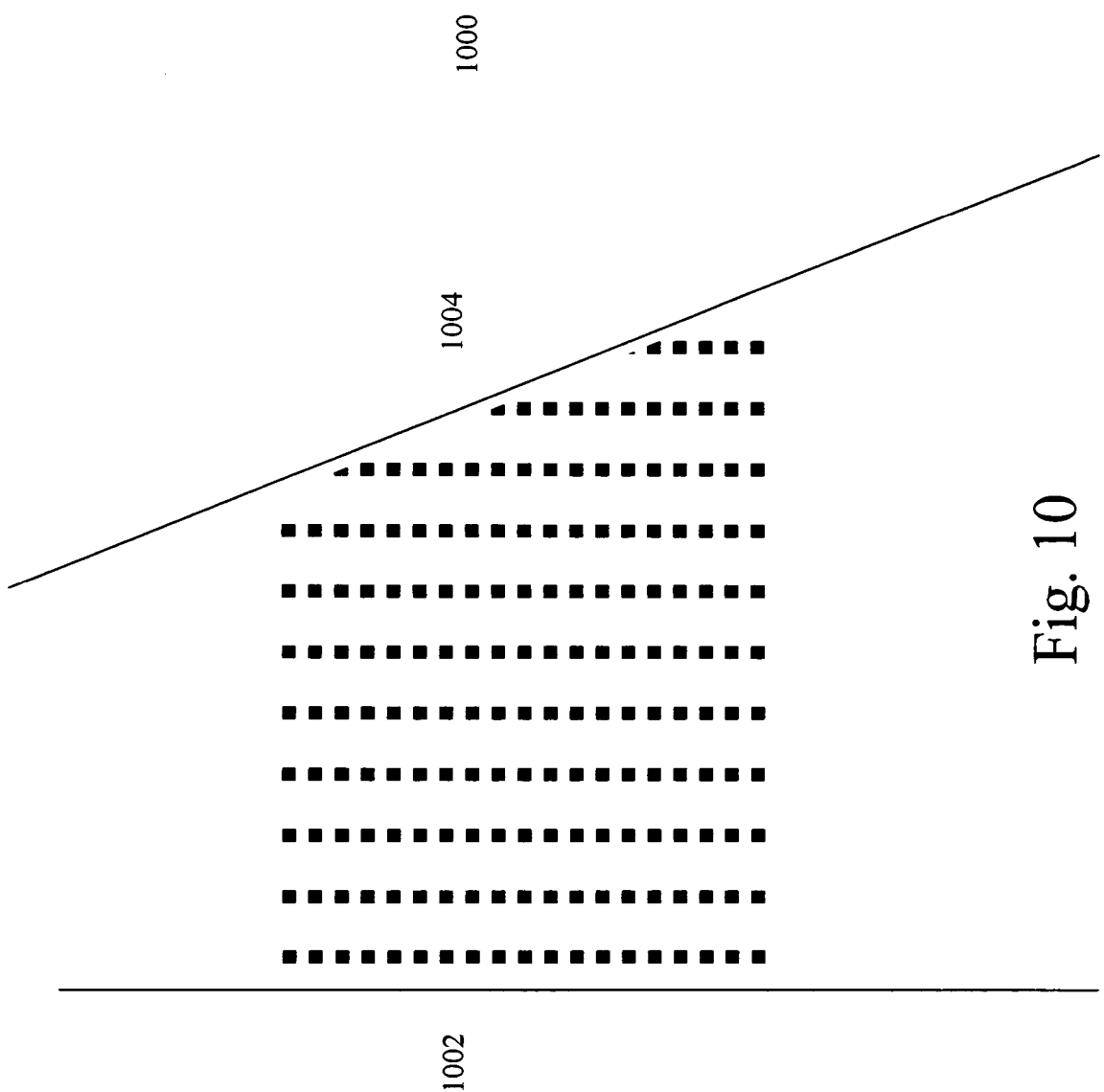
FIG. 10 is a cut away view of another alternate embodiment of the present invention.

FIG. 10 illustrates the transverse cross section of alternate embodiment 1000. One portion 1002 of the reactor wall is not parallel to another portion 1004 of a reactor wall.

Figure 11:
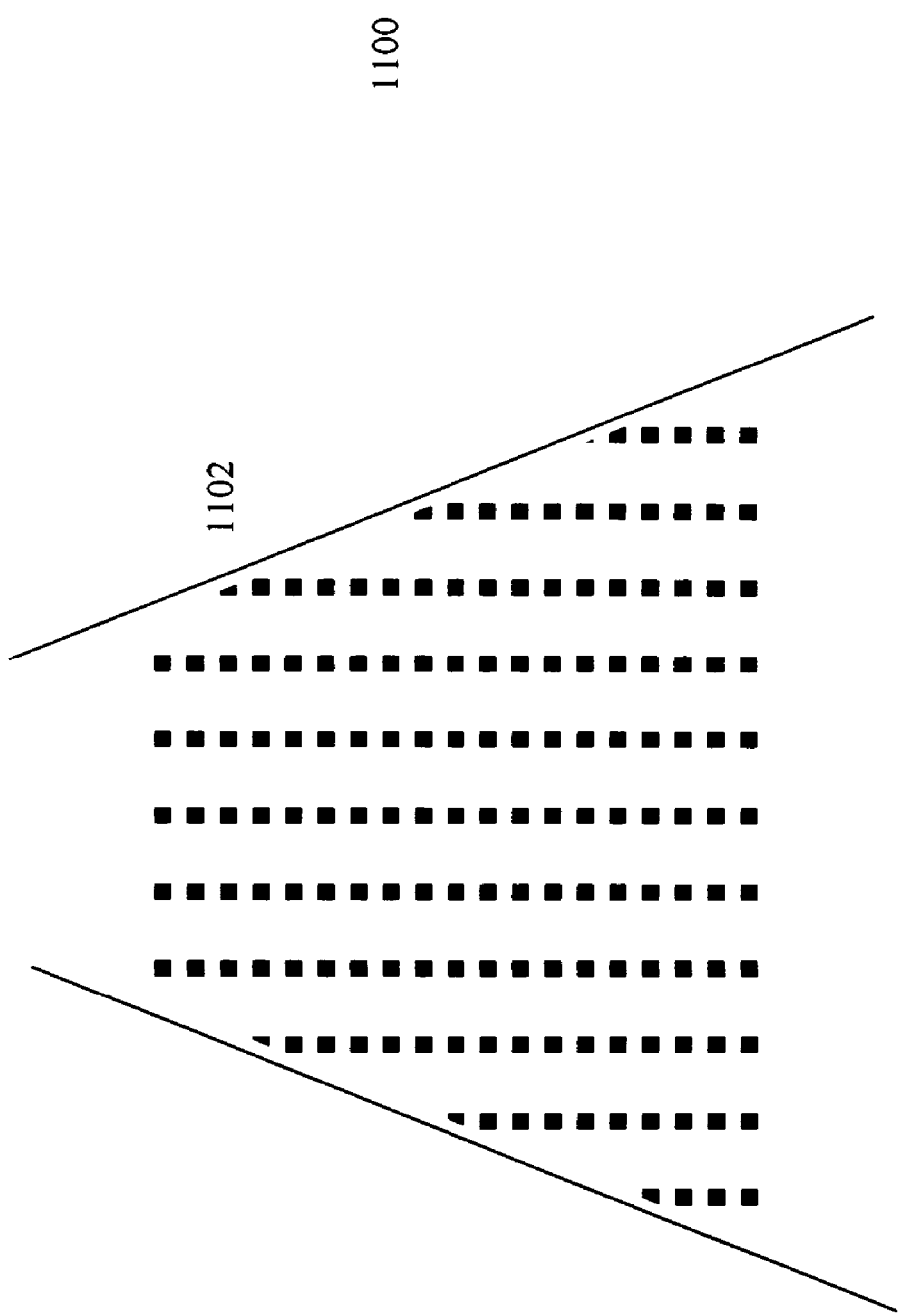
FIG. 11 is a cut away view of another alternate embodiment of the present invention.

FIG. 11 illustrates the transverse cross section of alternate embodiment 1100. The reactor wall 1102 has a conical shape.

Figure 12:
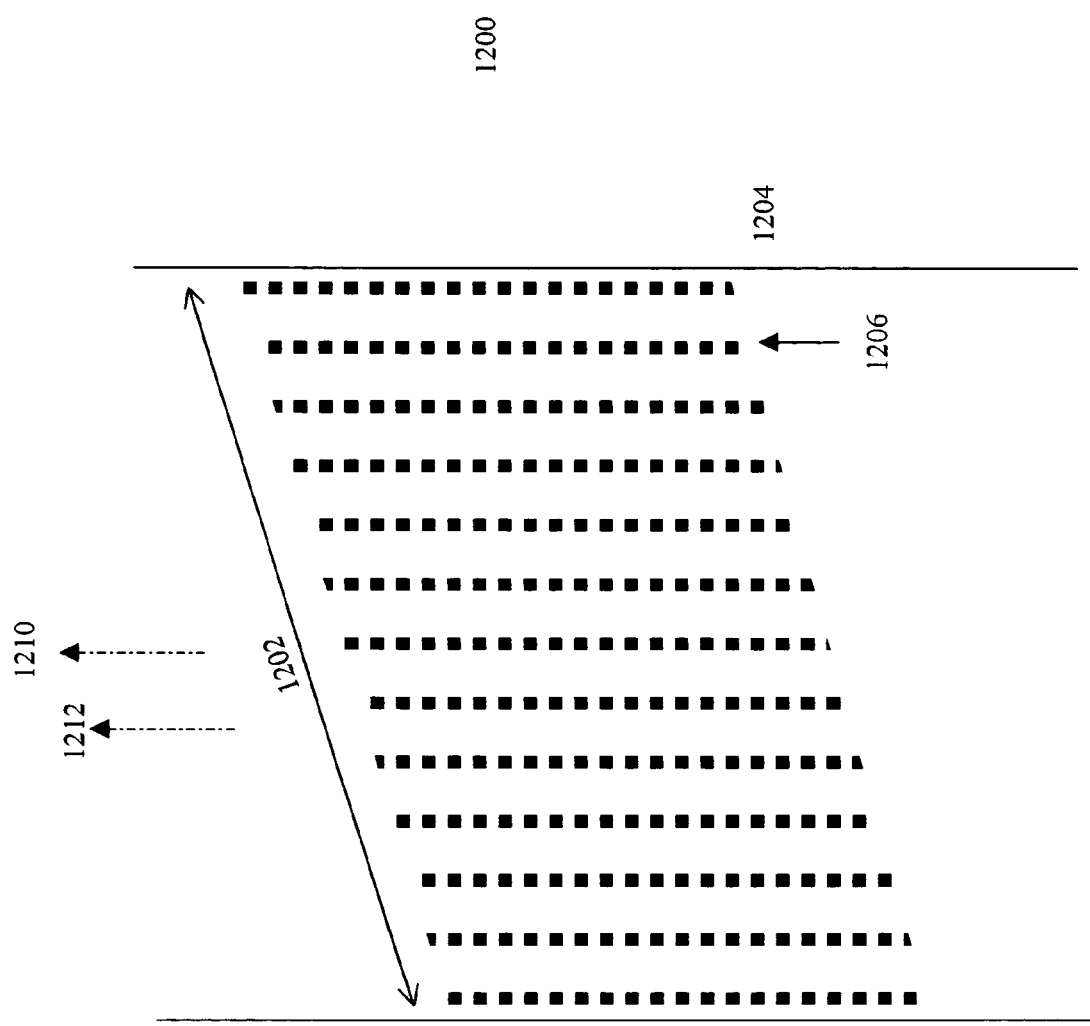
FIG. 12 is a cut away view of another alternate embodiment of the present invention.

FIG. 12 illustrates the transverse cross section of alternate embodiment 1200. Primary channels 1206 are parallel to reactor walls 1204. The face 1202 of the monolith is at an angle other than 90 degrees with respect to the reactor wall 1204 and the reactor axis 1210. The reactor axis 1210 is parallel to the axis 1212 of at least one primary channel. The axis of the reactor may be parallel to all of the axes of the primary channels.

Figure 13:
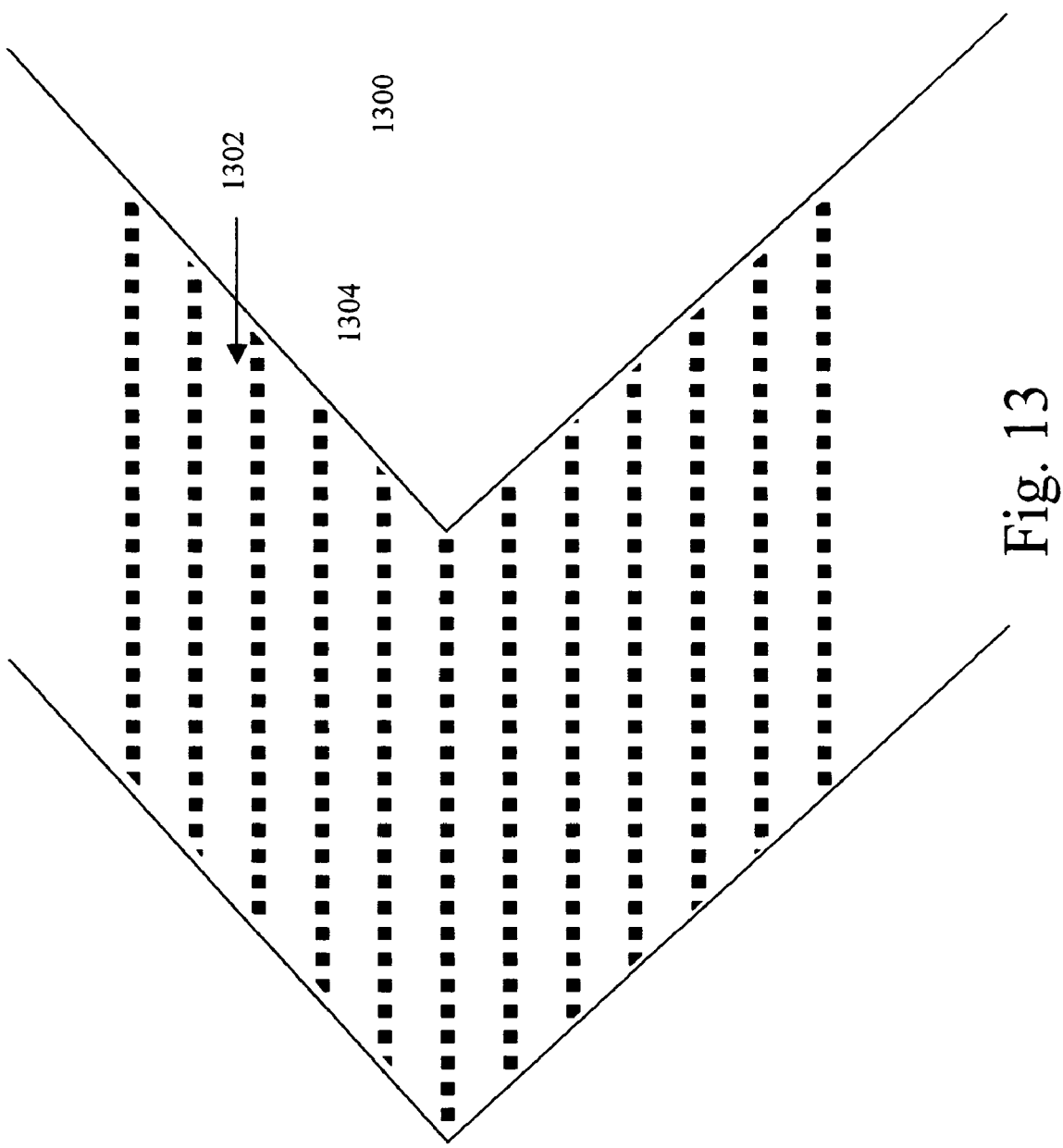
FIG. 13 is a cut away view of another alternate embodiment of the present invention.

FIG. 13 illustrates the transverse cross section of alternate embodiment 1300. Both ends of all primary channels 1302 are blocked by reactor wall 1304. Reactor wall 1304 is not normal to the primary channel walls and has a bend in it.

Secondary Channels

Figure 14:
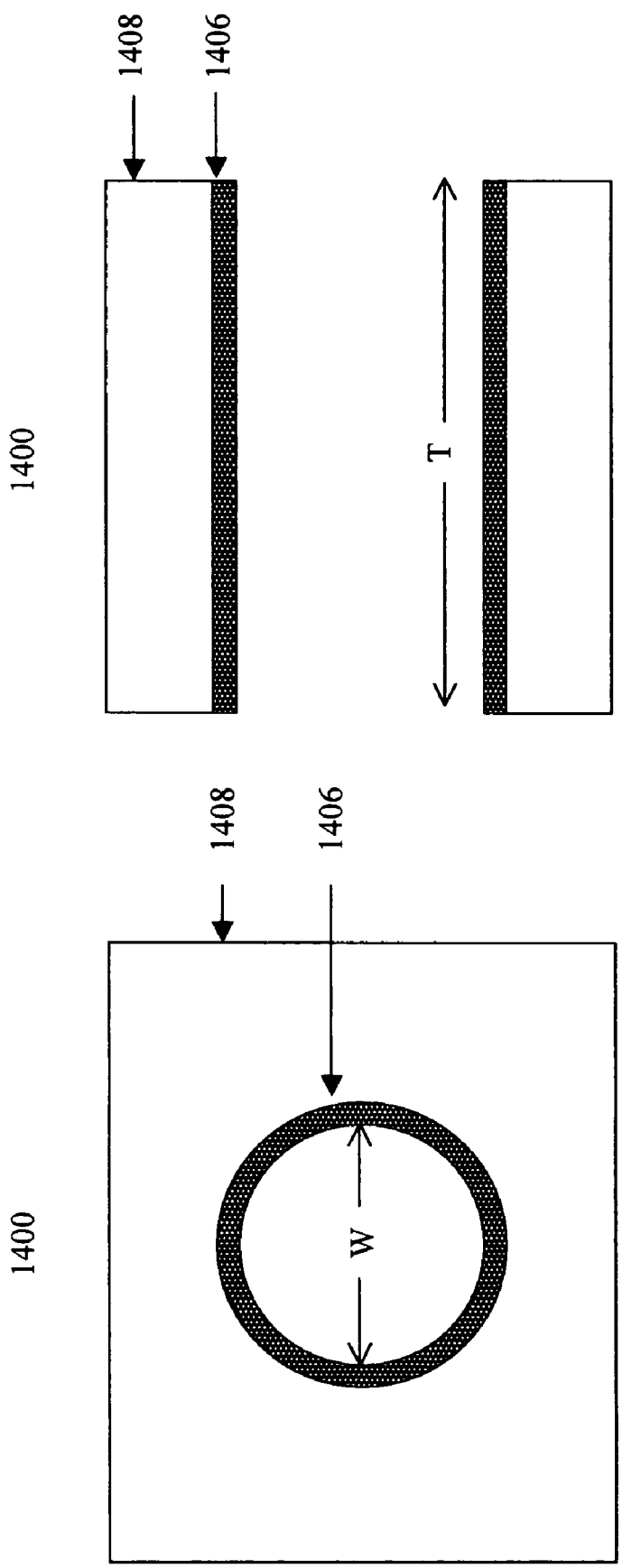
FIG. 14 is an illustration of a secondary channel.

FIG. 14 illustrates embodiment 1400 of a secondary channel. FIG. 14A shows a plan view of the secondary channel. FIG. 14B shows a cross section of the secondary channel.

Referring to FIG. 14A, the secondary channel is a cylindrical hole in a primary wall 1408 with a maximum width W. The inside of the hole is coated with catalyst 1406. Portions of the primary channel wall may also be coated with catalyst.

Referring to FIG. 14B, the length of the hole, T, is equal to the thickness of the primary channel wall.

It is preferred that the width W of the hole be less than or equal to 2 times the thickness T of the primary channel wall 1408. In this way, forming the hole will result in a net increase of surface area of the primary plus secondary channel wall area. If both the primary and secondary channel walls are coated with catalyst, then adding holes with a width W less than or equal to 2 times the thickness Th of the primary channel wall will result in more catalyst surface area per unit volume of monolith.

The hole may be straight through the wall, at an angle to the wall, or in a serpentine configuration. As used herein, we define the tortuosity of a secondary channel as the ratio of the length of a hole to the thickness of the primary channel. Straight holes normal to the primary channel wall have a tortuosity of 1. The porosity of sintered metal or ceramic powders or of porous foams can be 5 or more.

Suitable tortuosity is less than 2. Low tortuosity is preferred since it minimizes the pressure drop of fluid flowing through the secondary channel. Additionally, shorter holes have less length for boundary layer development and hence have higher mass and heat transfer to and from the monolith and higher reaction rates with the catalyst.

Figure 15:
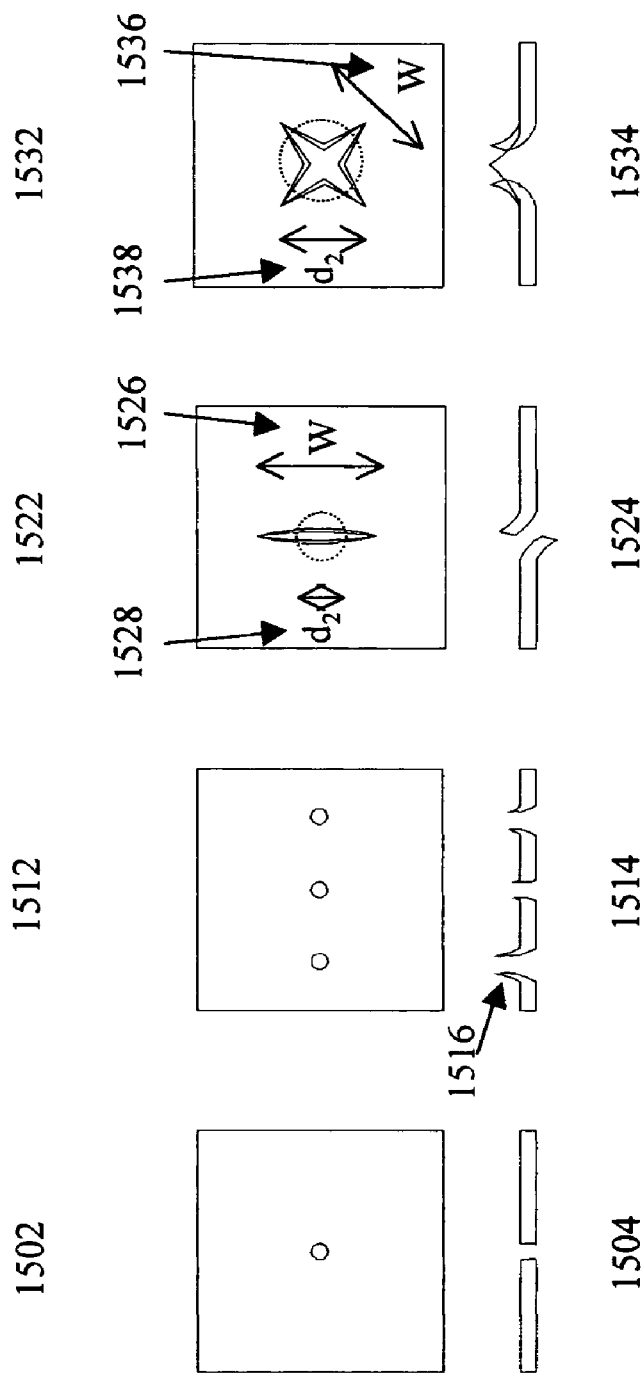
FIG. 15 is an illustration of several alternative secondary channels.

FIG. 15 illustrates alternate designs of secondary channels.

FIG. 15A illustrates a plan view 1502 and cross sectional view 1504 of a hole drilled through a primary channel wall. The hole may be made by conventional means including mechanical drilling, etching and laser drilling.

FIG. 15B illustrates a plan view 1512 and cross sectional view 1514 of holes punched through a primary channel wall. The punching action creates a bur 1516 around a hole. The burr can be preferred due to the fact that it creates more secondary channel surface area for a given diameter of the hole.

FIG. 15C illustrates a plan view 1522 and cross sectional view 1524 of a slit in a primary channel wall. The slit may be formed by conventional means, such as stamping. The slit is characterized by a maximum width W 1526 and a hydraulic diameter $d_2$ 1528.

As used herein, the hydraulic diameter of an opening is equal to 4 times the open area of an opening divided by the perimeter of the opening.

The dotted circles in FIGS. 15C and 15D indicate how big a circular hole would be of the same hydraulic diameter as the indicated opening. The dotted circles do not form part of the invention.

FIG. 15D illustrates a plan view 1532 and cross sectional view 1534 of a cross hole in a primary channel wall. The cross hole may be formed by conventional means, such as a punch. The cross hole is characterized by a maximum width W 1536 and a hydraulic diameter $d_2$ 1538.

Figure 16:
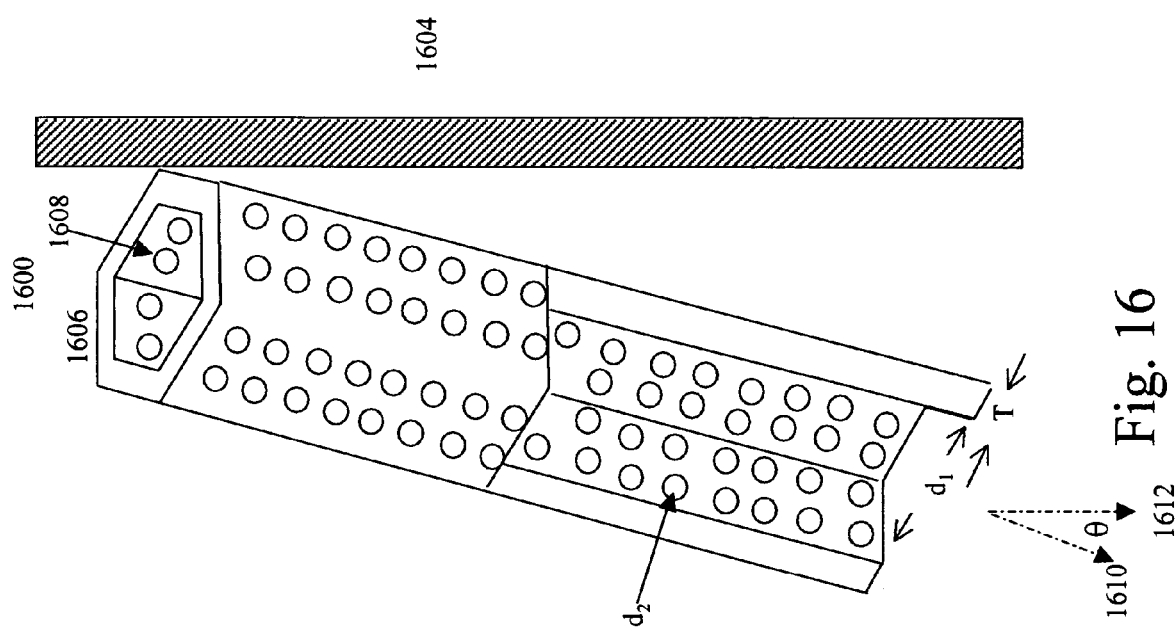
FIG. 16 is a partial cutaway view of the present invention illustrating primary and secondary channels.

FIG. 16 illustrates generic detail of a relationship of a reactor, a primary channel and secondary channels contained in the primary channel walls. A honeycomb monolith 1600 is placed in a reactor 1604. The reactor has a cylindrical cross section. The monolith comprises primary channels 1606. Only one primary channel is shown. Other primary channels lie adjacent to the illustrated primary channel and are parallel to it. The primary channels fill the cross section of the reactor.

Primary channel 1606 has an axis 1610. The axis is inclined at angle θ with respect to the axis 1612 of the reactor.

The primary channel shown in FIG. 16 is shown in partial cutaway mode to show the secondary channels terminating on the inside of the primary channel.

Reactor Design Criteria

For a reactor of given external dimensions, the present invention provides designs to achieve minimal reactor pressure drop or to achieve enhanced mixing and heat transfer at relatively higher reactor pressure drop.

To achieve a low pressure drop for a reactor, it has been found that a suitable design is given by the expression:

$$\theta = \arctan\left\{\left[\frac{P \cdot (1-P) \cdot GSA \cdot d_1 \cdot d_2}{K_1 \cdot \tau \cdot T}\right]^{\frac{1}{3}}\right\}$$

where θ is the angle of inclination of the axis of a primary channel with respect to the axis of the reactor. P is the fraction of primary channel wall that is perforated by secondary channels. GSA is the surface area of the primary channel walls if the primary channel walls are not perforated. $d_1$ is the hydraulic diameter of the primary channel. $d_2$ is the hydraulic diameter of the secondary channels. $K_1$ is a constant in the range of 0.2 to 20. $K_1$ is preferably in the range of 0.5 to 10. $K_1$ is more preferably about 2. τ is the tortuosity of the secondary channels. T is the thickness of the wall of the primary channel.

To enhance heat transfer between fluid and the reactor wall it has been found that a suitable design criteria is given by the expression:

$$\theta = \arctan\left\{\left[\frac{P \cdot (1-P) \cdot GSA \cdot d_1 \cdot d_2}{K_2 \cdot \tau \cdot T}\right]^{\frac{1}{3}}\right\}$$

where $K_2$ is a constant in the range of 0.01 to 1.5. $K_2$ is preferably in the range of 0.05 to 0.5. $K_2$ is more preferably about 0.2.

Table 1 illustrates the use of these expressions for calculating θ. Data is presented in Table 1 for Example 1 and Example 5.

TABLE 1

| Variable | Definition | Example 1 upper monolith | Example 1 lower monolith | Example 5 |
|---|---|---|---|---|
| $d_1$ | Primary channel hydraulic diameter | 5.4 mm | 17.2 mm | 2.4 mm |
| $d_2$ | Secondary channel hydraulic diameter | 134 micron | 3.45 mm | 27 micron |
| K | Multiplier | $K_1 = 2$ | $K_2 = 0.2$ | $K_1 = 2$ |
| τ | Tortuosity of secondary channels | 1 | 1 | 1 |
| P | Fraction of primary channel wall that is perforated or open due to secondary channels | 0.14 | 0.23 | 0.12 |
| T | Thickness of primary channel wall | 329 micron | 4.0 mm | 81 micron |

TABLE 1-continued

| Variable | Definition | Example 1 upper monolith | Example 1 lower monolith | Example 5 |
|---|---|---|---|---|
| θ | Angle of incidence of the primary channel axis with respect to the reactor axis. | 25 degrees | 55 degrees | 23 degrees |
| GSA | Geometric surface area of primary channel walls if they were unperforated | 734 m$^2$/m$^3$ | 232 m$^2$/m$^3$ | 1648 m$^2$/m$^3$ |

EXAMPLE 1

The example reactor comprises a steam reforming catalytic reactor comprising an upper monolith and a lower monolith. Each monolith is designed similarly to the monolith illustrated in FIG. 17, but without central column 1720 or spacers 1726. See Example 2 below for a more detailed description of the monolith in FIG. 17.

The monoliths are constructed of wire cloth. The wires are made of stainless steel or other material suitable for service in a steam reforming application. Pieces of wire cloth are corrugated with a sinusoidal pattern. Smooth and corrugated coated wire cloths are layered alternately and formed into frusta cones similar to those shown in FIG. 17 converging towards the reactor outlet. The smooth cones extend from their apexes to the reactor wall. The corrugated cones extend from the reactor wall to a distance of about 5 mm from the reactor axis and are trimmed to be flush with the reactor wall. The apexes of the cones point towards the exit of the reactor.

The reactor wall is a tube of circular cross section. The material is a high temperature metal alloy known to be suitable for a steam reforming application. The reactor has an inside diameter of 100 mm, an outside diameter of 120 mm and a length of 12 meters.

The upper monolith uses wire of 230 micron diameter. The spacing in both the warp and weft of the wire cloth is 28 wires per cm. Catalyst suitable for steam reforming is applied to the wire cloth by thermal spraying such that the coating is about 50 microns thick on the sides of the wires parallel to the surface of the wire cloth and is less than 5 microns thick on the sides of the wires normal to the cloth surface. About 14% of the cloth surface is open. The cloth thickness and secondary channel length are considered to be approximately 330 microns. The secondary channels have hydraulic diameters of approximately 134 microns.

The upper monolith is designed to provide a total surface area of both the primary and secondary channels of 1,500 m$^2$/m$^3$. θ is chosen to minimize the pressure drop through the top portion of the steam reformer. The upper monolith has sinusoidal corrugations with a 4.5 mm height difference from peak to trough and 4.5 mm wavelength. The primary channel hydraulic diameter is 5.4 mm. The GSA of the primary channels is approximately 734 m$^2$/m$^3$. Using a value of 2 for $K_1$ and a tortuosity of 1, the angle θ of the frusta cones to the reactor axis is 25°.

The lower monolith is designed to provide jet impingement cooling of the reactor wall by increasing the fluid velocity along the secondary channels and directing the jets emerging from secondary channels toward the reactor wall. The total surface area of the primary and secondary channels is designed to be 370 m$^2$/m$^3$.

The lower monolith uses wire of 3.8 mm diameter. The spacing in both the warp and weft of the wire cloth is 1.4 wires per cm. Catalyst suitable for steam reforming is applied to the wire cloth by thermal spraying such that the coating is about 100 microns thick on the sides of the wires parallel to the surface of the wire cloth and is less than 5 microns thick on the sides of the wires normal to the cloth surface. About 23% of the cloth surface area is open. The cloth thickness and secondary channel length are considered to be approximately 4.0 mm. The secondary channels have hydraulic diameters of approximately 3.45 mm.

The lower monolith comprises sheets with sinusoidal corrugations. The corrugations have a 10 mm height difference from peak to trough and 25 mm wavelength. The primary channel hydraulic diameter is 17.2 mm. The GSA of the primary channels is approximately 232 m$^2$/m$^3$. Using a value of 0.2 for $K_2$ and a tortuosity of 1, the angle θ of the frusta cones to the reactor axis is 55°. Jets emerging from secondary channels and impinging the reactor wall have initial velocities 5 times as high as the velocity of fluid flowing along the primary channels. The initial jet hydraulic diameters are 3.45 mm and the jets project 0 mm to 10 mm to impinge the reactor wall at center-to-center spacings averaging approximately 10 mm.

In operation, the outside of the reactor wall is heated by combustion. Heat transfer to the outside of the wall is enhanced by enriching the combustion air to at least 35% oxygen by volume. The combustion oxidant may have an oxygen content as high as 100% by volume. The fuel can be methane or other hydrocarbon.

The high oxygen content of the oxidant relative to air increases heat transfer relative to air by creating a higher radiant flame temperature and longer residence time for the combustion products inside a combustion chamber that the reactor is located in. Multiple reactors may be located in the same combustion chamber.

The combustion chamber may be at a pressure greater than one atmosphere.

EXAMPLE 2

Figure 17:
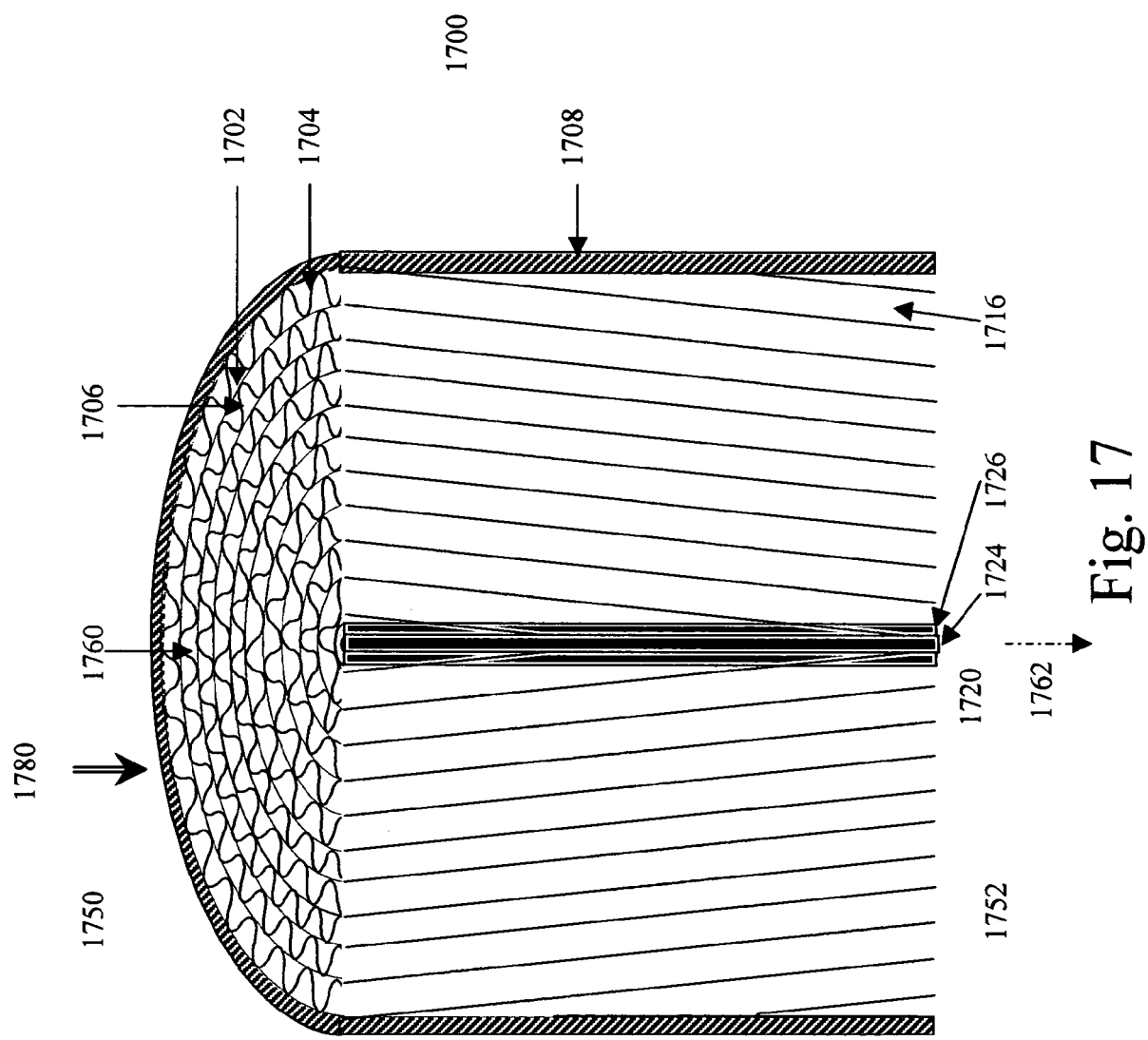
FIG. 17 is a partial perspective cut away view of an embodiment of this invention comprising a monolith of frustoconical corrugated layers.

FIG. 17 illustrates longitudinal and transverse cross sections of a second example 1700 of the invention. The example is a catalytic converter and has an inlet 1750, an outlet 1752, a monolithic substrate 1760 and cylindrical reactor wall 1708. Monolithic substrate 1760 is constructed of alternating corrugated sheets 1704 and smooth sheets 1702. The alternating sheets may either be in the form of alternating smooth and corrugated nested cones or of interleaved smooth and corrugated helixes at an oblique angle to the reactor axis. The spaces between corrugations and smooth sheets define primary channels 1706.

The corrugated and smooth sheets are inclined at an oblique angle to converter axis 1762. Thus, at least one primary channel 1716 is blocked at one end by reactor wall 1708.

Example 1700 further comprises optional central column 1720. Central column 1720 comprises center rod 1724 and frusta-conical spacers 1726. The spacers interleave the smooth sheets to support the monolith against axial forces imposed by fluid flow 1780. The corrugated sheets do not interleave the spacers.

Both the smooth and corrugated sheets are perforated to provide secondary channels (not shown). The perforations are round in shape and have diameters in the range of 20 to 30 microns.

The smooth sheets and corrugated sheets are formed of metal foil. The sheets are coated with a catalyst.

The corrugated sheets have a corrugation wavelength which increases with distance from the central rod. The wavelength increases less than proportionally to the distance from the central rod.

In an alternate embodiment, there is no central column 1720. The smooth sheets converge at the axis of the reactor. The corrugated sheets are open at the axis of the reactor.

The reactor functions with fluid entering either the inlet 1750 or the outlet 1752.

The reactor may comprise baskets which are secured to the reactor walls and which serve to hold the monolith in place.

EXAMPLE 3

Figure 18:
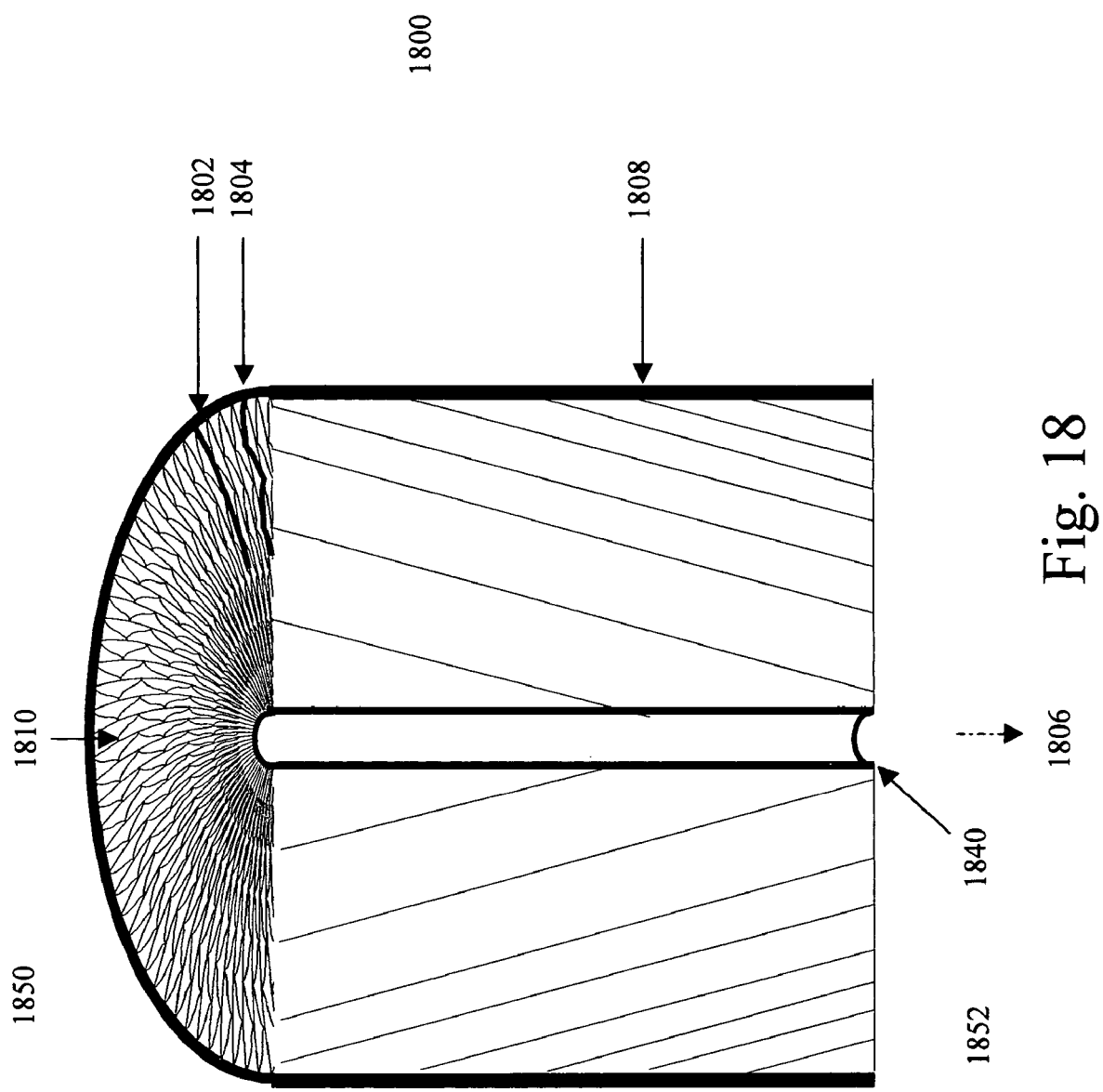
FIG. 18 is a partial perspective cut away view of an embodiment of this invention comprising a monolith with radial layers of corrugation inclined at an angle.

FIG. 18 illustrates transverse and longitudinal sections of alternate example reactor 1800. The reactor comprises an inlet 1850, outlet 1852, cylindrical reactor wall 1808 and monolith 1810. The monolith comprises alternating smooth sheets 1802 and corrugated sheets 1804. Portions of one each of the smooth and corrugated sheets are shown bold for clarity. The bold appearance does not form part of the invention. The layers of sheets are arranged radially and meet at or near a central core 1806. The spaces between the sheets are the primary channels.

A hollow conduit 1840 may be present in the center of the monolith. The hollow conduit will be discussed in more detail in the section "Additional Features" of the present application.

The primary channels are inclined at an angle with respect to the reactor walls such that at least some of the primary channels are blocked at one end and open at the other end. The angle of inclination between the primary channels and the axis 1806 of the reactor walls is about 30 degrees. The angle of inclination can be in the range of greater than 0 degrees and less than 90 degrees.

Both the smooth sheets and the corrugated sheets are perforated with holes of about 30 microns in diameter to form the secondary channels (not shown). The portion of the area of the primary channel walls that is open is 30%.

FIG. 20 provides more detail of how the monolith of this example is formed. In FIG. 20A, smooth sheet 2002 is placed next to corrugated sheet 2004 and bent about bend line 2006 with the corrugations at an oblique angle to the bend line 2006 to form leaf assembly 2000. In FIG. 20B, first leaf assembly 2012 is placed inside second leaf assembly 2014 to form nested leaf assembly 2010. Additional leaf assemblies are added to the nested leaf assembly until the nested leaf assembly is full. Corrugations on a given side of all nested assemblies are parallel to each other.

A single sheet (not shown) of smooth substrate without perforations may be inserted in the center of each nested leaf assembly. This separates the oppositely inclined corrugated sheets. The single unperforated sheet may be of greater thickness than the other sheets to stiffen the nested leaf assembly. The single unperforated sheet may be coated with catalyst and catalyst support material.

Several nested leaf assemblies are then joined side by side at bend line 2006 to form the monolith. Bend line 2006 runs along the reactor axis 1806 or next to the central hollow conduit 1840 (FIG. 18).

All of the sheets and assemblies may be joined to each other or to the reactor wall by brazing. The braze material may be coated on the sheet materials prior to forming and assembly.

Figure 23:
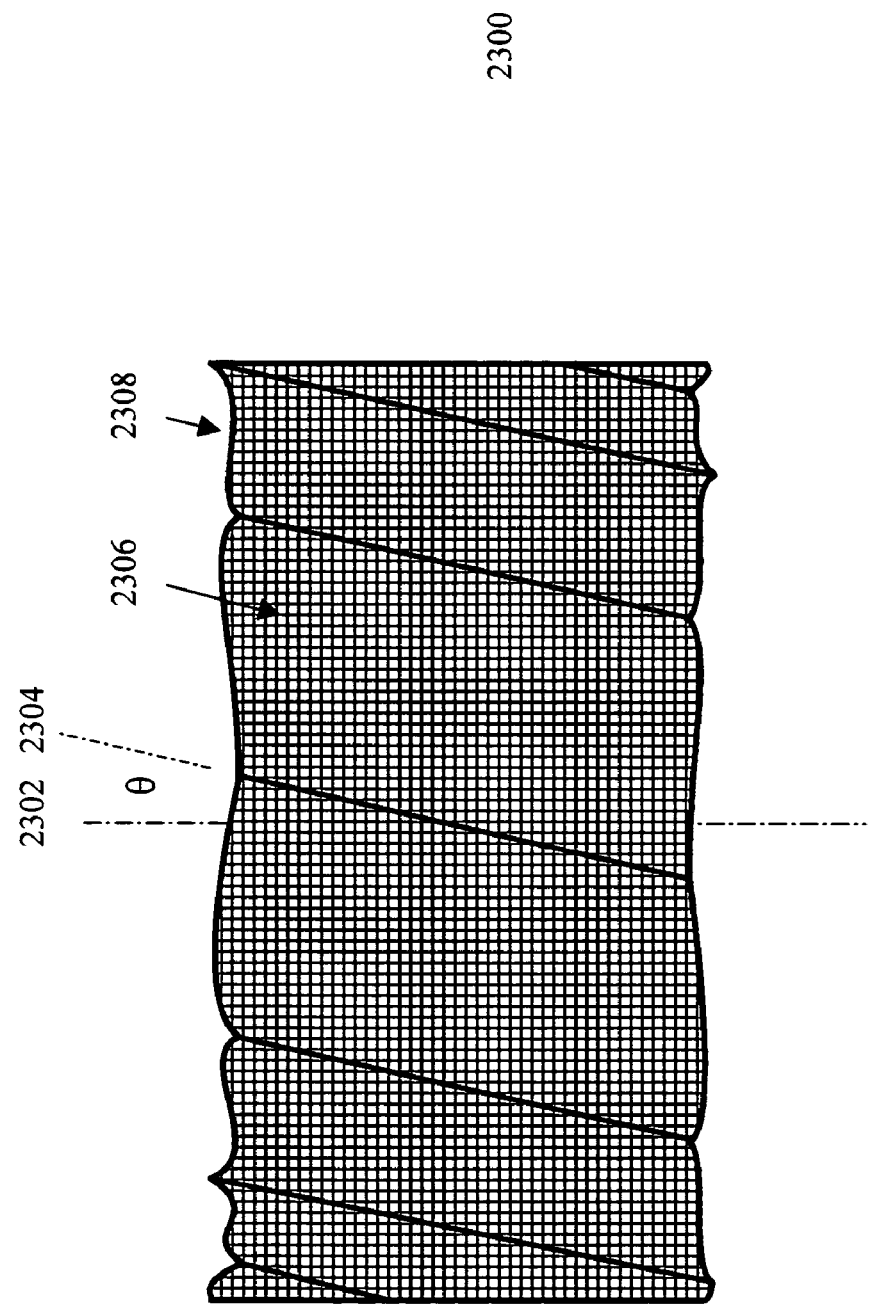
FIG. 23 is a plan view of a corrugated sheet to be used in FIG. 20.

FIG. 21 shows how a corrugated sheet might be formed. FIG. 21A shows a sheet material 2100 first folded into an accordion shape. FIG. 21B shows the sheet material after it has next been partially stretched into its final form. FIG. 21C shows the sheet material after it has lastly been fully stretched into its final form FIG. 23 shows a plan view of a corrugated sheet 2300 similar to that of FIG. 21C. The sheet is formed of a mesh material thus creating numerous secondary channels 2306. The axes 2304 of the primary channels 2308 are at an angle $\theta$ with respect to the bend line 2302. The maximum width of the primary channels at the wall is W.

Secondary channels may be formed in the sheets, and catalyst may be placed in the secondary channels before the sheets are formed into their smooth or corrugated forms. Substrate coating for catalyst support may be applied by dipping in a slurry, thermal spraying or other known means.

The monolith and the reactor walls may be made of high temperature metal alloy, such as stainless steel.

The monolith may also be an extrusion. The monolith may be made of ceramic, such as cordierite or alumina.

Figure 22:
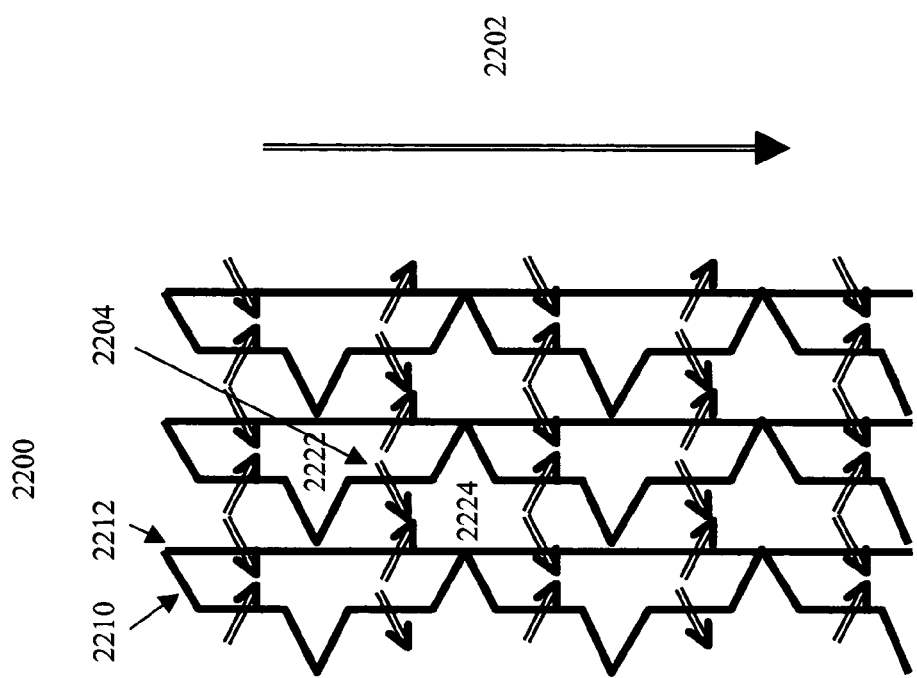
FIG. 22 is a longitudinal section of a portion of a monolith illustrating the flow of fluid through secondary channels.

FIG. 22 illustrates how the angling of the primary channels with respect to the reactor axis causes the fluid to pass unidirectionally through the secondary channels. FIG. 22 is a small portion 2200 of a longitudinal cross section of a reactor similar to reactor 1800 (FIG. 18). The reactor is constructed with smooth sheets 2212 and sharp angle corrugated sheets 2210. The overall flow direction is 2202. The angling of the primary channels with respect to the axis of the reactor at least in part causes secondary channel flow 2204 to proceed from one primary channel 2222 to an adjacent primary channel 2224. For reactors where there is only catalyst in the secondary channels, the fluid being processed experiences successive reactions with catalyst as plug flow in the secondary channels and mixing in the primary channels. Thus the reactor may be described as a series of successive alternating plug flow reactors and well-stirred mixers. The number of primary channels that a given portion of fluid passes through can be considered as the number of stages of reaction plus mixing that the fluid passes through.

EXAMPLE 4

Figure 19:
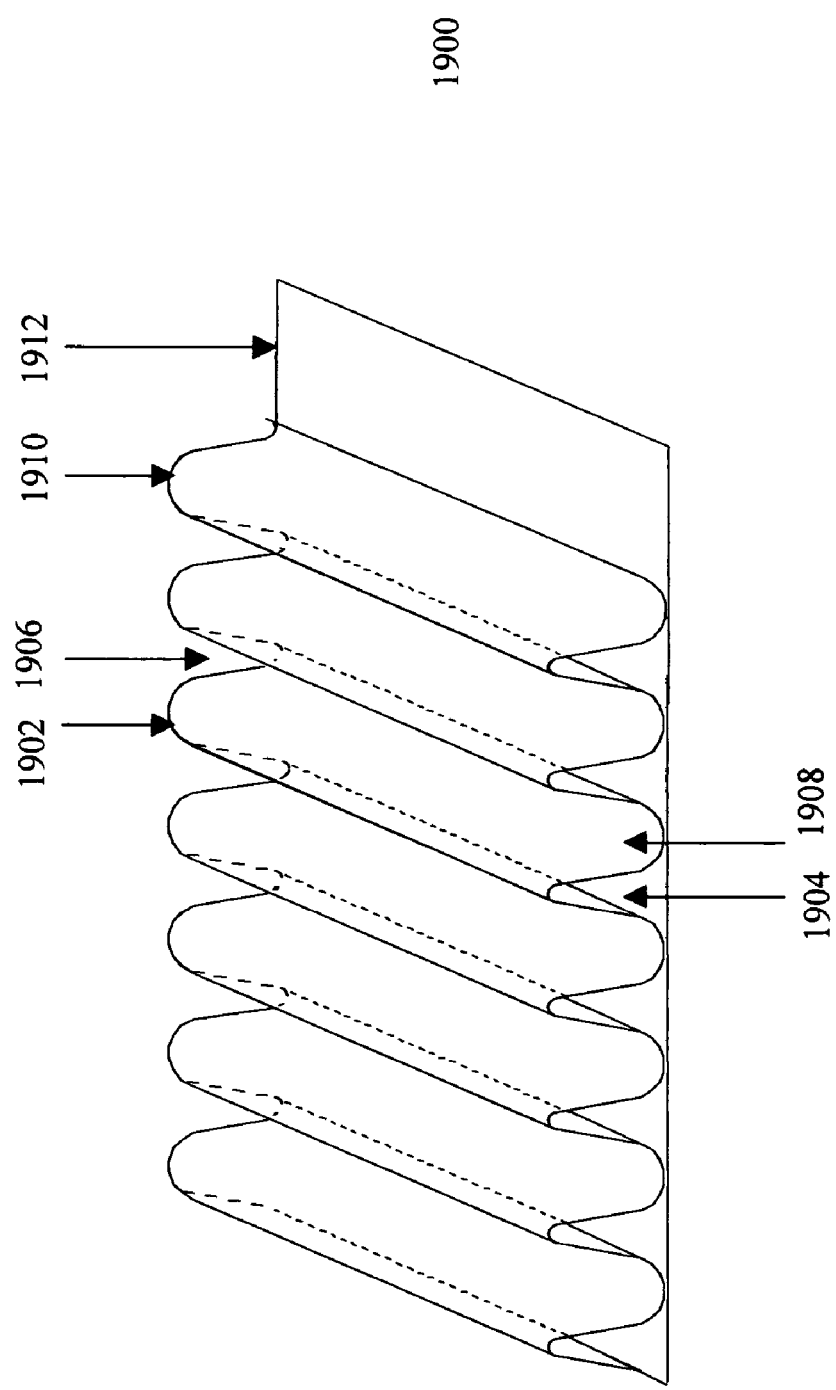
FIG. 19 is a perspective view of an embodiment of the invention comprising restricted but not blocked primary channels.

FIG. 19 is a perspective view of alternate embodiment 1900 of the present invention. Embodiment 1900 comprises alternating layers of tapered corrugated sheets 1910 and smooth sheets 1912. Primary channels are formed by the spaces between the sheets. Secondary channels (not shown) are formed by perforating both the smooth sheets 1912 and the corrugated sheets 1910. Secondary channels could also be formed by perforating only the corrugated sheets or only the smooth sheets.

Only one corrugated and one smooth sheet is shown in FIG. 19 for clarity.

In this embodiment, flow through the secondary channels results from the relatively large inlets 1902 of some primary channels and the relatively small outlets 1904 of the same channels. Hence said primary channels decrease monotonically in cross sectional area.

Flow through the secondary channels is further promoted by the corresponding relatively small inlets 1906 and large outlets 1908 of the primary channels adjacent to the primary channels with large inlets and small outlets. Hence these primary channels increase monotonically in cross sectional area.

No primary channels need to have one end completely blocked in order to for this embodiment to be effective. In the embodiment 1900 in which the convergent ends of primary channels are blocked, the present invention is useful as a particulate trap, such as in catalytic converters for diesel engine exhaust aftertreatment. The ends may be blocked by a porous or nonporous material or by virtue of the primary channel convergence zero cross sectional area.

EXAMPLE 5

A catalytic converter is formed according to the embodiment illustrated in FIG. 18. The catalytic converter is suitable for treatment of internal combustion engine exhaust gases containing CO, hydrocarbons and NOx. The internal combustion engine may power a vehicle.

The primary channel wall consists of wire cloth with 51 micron diameter wires of stainless steel spaced 130 wires per cm in both warp and weft. The catalyst and associated support is suitable for internal combustion engine exhaust gas aftertreatment. The catalyst support is applied to the wire cloth by thermal spraying such that the coating is 15 microns thick on the sides of the wires parallel to the surface of the cloth and is less than 5 microns thick on the sides of the wires normal to the cloth surface. 12% of the cloth surface area is open. The cloth thickness and secondary channel lengths are considered to be approximately 81 microns. The secondary channels have hydraulic diameters of approximately 27 microns.

Some pieces of wire cloth are corrugated with a sinusoidal pattern. Smooth and corrugated coated wire cloths are layered alternately and formed into 6 nested leaf assemblies, with each nested leaf assembly enclosing a 60° angle. The reactor wall is a tube of circular cross section with an inside diameter of 125 mm and a length of 125 mm.

The reactor is designed to provide a total surface area of the primary and secondary channels of 3,700 $m^2/m^3$ while minimizing the pressure drop. The maximum difference in height from corrugation troughs to peaks is 2 mm at the reactor wall and the corrugation wavelength is 2 mm at the reactor wall. The GSA of the primary channels without its secondary channels is approximately 1,650 $m^2/m^3$, and the average primary channel hydraulic diameter is about 2.4 mm. Using a value of 2 for $K_1$ and a tortuosity of 1, the angle of the corrugations to the reactor axis is 23°.

Six nested leaf assemblies are formed each with a single solid sheet at their centers. The single solid sheets are 80 microns thick with a 15 micron thick coating of catalyst support.

Adjacent sides of nested leaf assemblies have parallel primary channels.

The six nested assemblies are joined side by side about a common bend line to form a monolith. The monolith is slightly flexed or rotated to compressively fit inside the converter walls. The monolith fills the reactor cross section.

The portion of the area of the reactor cross sectional area that is open, referred to herein as the "open face area" or OFA, is about 95%.

A finely divided noble metal catalyst is deposited on the catalyst support using conventional means. Exhaust gas from an internal combustion engine is passed through the reactor. The hydrocarbons, NOx and CO in the exhaust gas are converted to carbon dioxide, nitrogen and water.

EXAMPLE 6

A reactor is designed similar to the reactor of Example 5 above, but with holes punched in 80 micron thick solid sheets to form secondary channels. The holes have 10 micron long burrs on their ends.

EXAMPLE 7

The reactor of Example 5 is combined with a bypass valve in an automotive exhaust. The bypass valve diverts input gases through a bypass pipe to a midsection of the monolith. The bypass is activated, causing fluid to bypass the initial section of the monolith, when the temperature in the inlet of the monolith reaches a certain maximum threshold. Alternatively, the bypass may be activated after a certain predetermined period of time subsequent to the start of the automobile.

Cooling means, such as a heat exchanger, may be provided in the bypass pipe to cool the exhaust gases before they enter the midsection of the monolith. In this manner, the temperature of the monolith remains below a certain threshold such as the sintering temperature of the catalyst or its substrate.

Similar combination of reactor and bypass pipe may be designed with the ratio of the width of the reactor to the length of the reactor less than or equal to one.

The reactor may comprise at least one other structure comprising a catalyst where the bypass pipe introduces gas between the monolith and the at least one other structure. The structure may be a monolith according to the present invention. The structure may also be a container of catalyst beads.

The structure may be a microlith such as that described in U.S. Pat. No. 5,051,241 to Pfefferle and incorporated herein by reference. The reactor may incorporate a bypass valve and bypass pipe to bypass the microlith and pass fluid directly through the monolith of the present invention.

EXAMPLE 8

A reactor according to Example 5 is constructed except that there is no catalyst on the monolith. The reactor serves to efficiently and uniformly heat the fluids flowing therein. Alternatively, the fluids within the reactor may be at higher temperature than the ambient and hence the reactor serves to cool the fluids.

Additional Features

The present invention can be modified in several ways to create useful effects.

In one embodiment, the secondary channels may be non-uniformly distributed over the walls of the primary channels such that the flow of process fluids may be directed towards or away from the reactor walls at various locations. For example, in single row, multi-tube steam reformers, some sides of the reactor tubes face a source of combustion and hence have a higher heat flux than other sides. The secondary channels in combination with the inclined primary channels can be designed to direct the flow to the side of the reactor with the high heat flux more than to the other sides. Thus the convective heat transfer coefficient at the sides of the reactors with the high heat flux can be made relatively higher than at the other sides.

In other embodiments, the combination of the primary and secondary channels can be designed such that the process fluid flows in a helical or other desired path within the converter.

The distribution of the secondary channels can be adjusted such that the process fluids flow alternately towards and away from the reactor walls. For example, referring to FIG. 17 unless otherwise indicated, a first series of at least one of either the corrugated sheets 1704 or smooth sheets 1702 may have a relatively lower resistance to flow, such as a higher density of secondary channels near the reactor wall 1708. Thus a relatively large proportion of the process fluid in the reactor will flow near the reactor wall when it impinges on said first at least one smooth or corrugated sheet. Similarly, a second series of at least one of either the corrugated sheets 1704 or smooth sheets 1702 may have a relatively lower resistance to flow, such as a higher density of secondary channels near the converter axis 1762. Thus a relatively large proportion of the process fluid in the reactor will flow near the converter axis when it impinges on said second at least one smooth or corrugated sheet. By alternating said first and said second series of sheets, the process fluid can be made to alternately flow near the reactor wall and near the reactor axis. This flow pattern significantly increases the heat transfer with the reactor walls. By adjusting the concentration of secondary channels near the reactor axis or reactor walls relative to the concentration of the secondary channels in the rest of the primary channels, the designer can adjust desired combinations of high heat transfer (high concentration of secondary channels near the reactor walls and axis) and low pressure drop (uniform concentration of secondary channels along primary channels). In one extreme, the secondary channels are found only near the reactor walls or the axis. In the other extreme, the secondary channels are distributed uniformly along the primary channels.

Similar effects can be achieved by varying the diameters of the secondary channels.

In an alternate embodiment, the thickness of the catalytically active coating on the monolith can be varied as a function of the local reaction rates. For example, the present invention may be used as a reactor in a steam reformer. Catalyst is applied to at least the walls of the secondary channels as finely divided material on a porous support structure. Fluids at the inlet of a steam reformer reactor are at a relatively low temperature such that the activity and surface area of the active catalyst constrains the overall reaction kinetics. In such situations the catalytically active material participates in the desired reaction at greater depths within the pores of its support structure. Near the inlet of the reactor, therefore, it is preferred to apply thicker catalyst support material of 50 to 300 microns to the monolith. In downstream locations in the said reactors the temperatures are higher, making the catalyst more active at the outer surfaces of the catalyst support structures such that thinner coatings of catalyst of 10 to 100 microns may be applied as a function of the thermal profile in the reactor. Similarly, the coating thicknesses may be thinner near the walls of the reactor, where temperatures are higher. Thicker coatings may be applied near the axis of the reactor.

In another alternate embodiment, thermal conduction through the catalyst support material and the thermal conduction along the length of the substrate the catalyst support material is applied to may be varied independently. Coating a relatively thick substrate of high thermal conductivity and of a substantially direct thermal path from the converter wall to the converter axis with a relatively thin catalytic support material of low conductivity, favors better heat transfer between the catalyst wall and the interior of the converter. For reactors according to the present invention for treating exhaust gases of internal combustion engines, this configuration helps keep the temperature more uniform in the reactor to minimize overheating at the reactor axis.

For reactors according to the present invention used in steam reforming, the transfer of heat from the reactor wall to the more central portions of the reactor prevents local overheating of hydrocarbons that could precipitate carbon. The carbon can foul the catalyst.

Conversely, coating a relatively thin substrate of low conductivity with a catalytic support material of relatively high resistance to thermal conductivity, favors the local transfer of heat between the reactor wall and process fluids nearer the reactor wall.

In another alternative embodiment, the angle of the primary channels to the axis of a reactor may be adjusted to alter the view factor for radiant heat transfer between the reactor walls and the interior of the monolith. If the view factor is large, such as by a relatively large angle, then heat transfer by radiation to the interior of the monolith is improved.

In another alternative embodiment, reactors designed according to the present invention may comprise a hollow column which conveys relatively unreacted inlet fluids to interior portions of the monolith. Hollow columns may also be designed such that reacted fluids are removed from interior portions of the monolith.

For example, referring to FIG. 18 unless otherwise specified, a reactor similar to reactor 1800 is designed with an additional central conduit 1840 therein. The conduit is coincident with the axis 1806 of the reactor. The reactor is used for steam reforming.

The conduit conveys at least a portion of the inlet fluid comprising hydrocarbons to one or more designated positions along the length of the catalytic converter thus shielding the portion of inlet fluids from immediate exposure to the relatively high temperature reactor walls. By withholding a portion of the hydrocarbons from exposure to the heated tube walls, the remainder of the inlet fluids have a higher ratio of steam to carbon and a higher heat flux through the tube walls can be accommodated without carbon precipitation. By introducing the withheld hydrocarbons downstream in the monolith, desirably high ratios of carbon to steam may be obtained overall. This permits increased throughput and decreased the steam export.

The central conduit may distribute inlet fluids into the surrounding monolith via lateral holes in the central conduit. The inlet fluids react with the steam present in the monolith which increases the heat load on the said downstream portions of the reactor.

By withholding a portion of the hydrocarbons from the monolith at the reactor inlet, the reactor has a lower thermal load at the inlet and a more uniform thermal profile from inlet to outlet for optimal operating temperatures. Further, the inlet fluids conveyed by the central conduit encounter less pressure drop than if conveyed through dispersed catalytic surfaces, saving compression energy.

The inlet fluids introduced via the central conduit may be at a lower temperature than the monolith. The conduit may also thermally insulate the fluid it conveys from the monolith, helping to preserve the low temperature of the inlet fluids to help level the thermal load on the reactor and maintain a uniform temperature profile.

The central conduit may be used to remove hydrogen from the process fluids to permit more complete reaction of hydrocarbons to hydrogen. The central conduit may comprise a hydrogen permeable membrane, such as palladium or platinum.

In another alternative embodiment, a reactor according to the present invention comprising alternating smooth and corrugated sheets may have said sheets with different thicknesses. For example, the smooth sheets may be thicker or otherwise made stronger than the corrugated sheets.

This invention may be used as a mixer or emulsifier.

The inlet fluid to the invention may be a mixture of liquid and gas or a mixture of immiscible liquids.

If a monolith according to the present invention is to be inserted into tubing which has a rough or irregular surface and if radial heat transfer is desired, the primary channel walls may be slit in the portions adjacent to the tubing such that monolith can deform to the shape of the tube and thus effect good radial heat transfer.

The monolith of the present invention may be compressed within a compression sleeve for mounting or retrofitting the monolith into tubes. The compression sleeve may be a material that volatizes during use, allowing the monolith to expand and conform to the rector walls. The compression sleeve may also be a brazing material which may be coated with a fluxing material. If fluxing material is used on the outer surface of the sleeve, the sleeve may be a perforated sheet, net, mesh, powder metal or otherwise permeable surface. Before service the reactor is heated to melt the brazing material and thus attach the monolith to the reactor wall.

At increased angles between the reactor axis and the primary channels and for monoliths compressed as described above, the primary channels will increasingly act as load bearing beams to provide compression of the monolith against the reactor walls. The compression of the monolith should not exceed the yield strength or creep strength of the substrate for the anticipated temperature exposure of the reactor during manufacturing, storage and service.

Having thus described the invention with particular reference to the embodiments thereof, it will be obvious that various changes and modifications can be made therein without departing from the spirit and scope of the present invention as defined in the appended claims.

Wherefore I claim:

1. A monolith for use in a reactor, the monolith comprising an inlet, an outlet, an axis, a plurality of primary channels being non-annularly radially arrayed or helically arrayed, with the plurality of primary channels being oblique with respect to the axis of the monolith, and a plurality of secondary channels fluidly coupled to the plurality of primary channels and providing fluid communication between and among the plurality of primary channels.

2. The monolith of claim 1, wherein the plurality of primary channels are defined by primary channel walls, and wherein the plurality of secondary channels are defined by secondary channel walls which comprise perforations which extend through the primary channel walls to fluidly couple adjacent ones of the plurality of primary channels.

3. The monolith of claim 2, wherein the primary channel walls comprise wire cloth having holes, and wherein the holes of the wire cloth comprise the secondary channels.

4. The monolith of claim 2, further comprising a catalyst disposed on at least one of the primary channel walls and the secondary channel walls.

5. The monolith of claim 2, further comprising a conduit which extends from the outlet of the monolith into an interior region of the monolith and which fluidly couples the outlet of the monolith to the interior region of the monolith.

6. The monolith of claim 5, wherein process fluids produced by the monolith are removed from the monolith via the conduit.

7. The monolith of claim 6, wherein the conduit is defined by a wall which comprises a hydrogen permeable membrane, wherein the monolith is used for catalytic steam reforming, and wherein hydrogen produced during the catalytic steam reforming is removed from the monolith via the conduit.

8. The monolith of claim 1, wherein the plurality of primary channels are defined by primary channel walls, the monolith further comprising a catalyst disposed on a surface of the primary channel walls.

9. The monolith of claim 1, wherein the plurality of primary channels comprise sheets inclined at an oblique angle with respect to an axis of the monolith.

10. The monolith of claim 1, wherein the plurality of primary channels are inclined at an oblique angle with respect to the axis of the monolith and arrayed in a radially symmetrical pattern.

11. The monolith of claim 1, wherein the plurality of the primary channels intersect the axis of the monolith and are arrayed in a radially symmetrical pattern.

12. The monolith of claim 1, wherein the plurality of primary channels are uniformly inclined at an oblique angle with respect to the axis of the monolith.

13. The monolith of claim 1, wherein the plurality of primary channels are oblique with respect to the axis of the monolith at points of intersection with said axis of the monolith.

14. A monolith for use in a reactor, the monolith comprising an inlet, an outlet, an axis, a plurality of primary channels being non-annularly radially arrayed or helically arrayed, with the plurality of primary channels being oblique with respect to the axis of the monolith, wherein the plurality of primary channels comprise corrugated and non-corrugated sheets in which the corrugations of the corrugated sheets are inclined at an angle which is oblique with respect to the axis of the monolith.

15. A monolith for use in a reactor, the monolith comprising an inlet, an outlet, an axis, a plurality of primary channels and a plurality of secondary channels, the plurality of secondary channels being fluidly coupled to the plurality of primary channels and providing fluid communication between and among the plurality of primary channels, wherein the cross-sectional area of at least a portion of the plurality of primary channels increases and the cross-sectional area of the primary channels adjacent to said at least a portion of the plurality of primary channels decreases in a direction from the inlet of the monolith to the outlet of the monolith.

16. The monolith of claim 15, wherein the plurality of primary channels are defined by primary channel walls, and wherein the plurality of secondary channels are defined by secondary channel walls which comprise perforations that extend through the primary channel walls to fluidly couple adjacent ones of the plurality of primary channels.

17. The monolith of claim 16, further comprising a catalyst disposed on at least one of the primary or secondary channel walls.

18. The monolith of claim 17, wherein the primary channel walls comprise a wire cloth having perforations, and wherein the perforations of the wire cloth comprise the secondary channels.

19. The monolith of claim 15, wherein each of the plurality of primary channels have an inlet and an outlet, and wherein each of the at least a portion of primary channels in which the cross sectional area decreases in the direction from the inlet of the monolith to the outlet of the monolith are occluded at their outlets and the at least a portion of primary channels in which the cross sectional area increases from the inlet to the outlet of the monolith are occluded at their inlets.

20. The monolith of claim 15, wherein the plurality of primary channels are inclined at an oblique angle with respect to the axis of the monolith and arrayed in a radially symmetrical pattern.

21. The monolith of claim 15, wherein the plurality of the primary channels intersect the axis of the monolith and are arrayed in a radially symmetrical pattern.

22. The monolith of claim 15, wherein the plurality of primary channels are uniformly inclined at an oblique angle with respect to the axis of the monolith.

23. The monolith of claim 15, wherein the plurality of primary channels are oblique with respect to the axis of the monolith at points of intersection with said axis of the monolith.

* * * * *